(12) United States Patent
Hatta et al.

(10) Patent No.: US 9,702,558 B2
(45) Date of Patent: Jul. 11, 2017

(54) COMBUSTION PRESSURE SENSOR AND METHOD OF MANUFACTURING THE SAME

(71) Applicant: NGK Spark Plug Co., Ltd., Nagoya, Aichi (JP)

(72) Inventors: Tomonari Hatta, Aichi (JP); Yoshihiro Nakamura, Aichi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 269 days.

(21) Appl. No.: 14/521,527

(22) Filed: Oct. 23, 2014

(65) Prior Publication Data

US 2015/0114095 A1 Apr. 30, 2015

(30) Foreign Application Priority Data

Oct. 25, 2013 (JP) .................................. 2013-222753
Sep. 23, 2014 (JP) .................................. 2014-193191

(51) Int. Cl.

| G01M 15/00 | (2006.01) |
|---|---|
| F23Q 7/00 | (2006.01) |
| F02P 19/02 | (2006.01) |
| G01L 23/10 | (2006.01) |
| B23K 15/00 | (2006.01) |
| B23K 26/28 | (2014.01) |

(Continued)

(52) U.S. Cl.
CPC .......... *F23Q 7/001* (2013.01); *B23K 15/0006* (2013.01); *B23K 26/28* (2013.01); *F02P 19/028* (2013.01); *G01L 7/00* (2013.01); *G01L 23/08* (2013.01); *G01L 23/10* (2013.01); *F23Q 2007/002* (2013.01); *F23Q 2007/005* (2013.01)

(58) Field of Classification Search
USPC ......................................... 73/114.18, 114.01
See application file for complete search history.

(56) References Cited

U.S. PATENT DOCUMENTS 4,169,388 A * 10/1979 Teitelbaum ............. G01L 23/22
73/114.21
4,602,506 A * 7/1986 Sawamoto ............... G01L 23/22
73/114.21

(Continued)

FOREIGN PATENT DOCUMENTS

| JP | 2013-024488 A | 2/2013 | ............. F02P 12/00 |
|---|---|---|---|
| JP | 2013-040751 A | 2/2013 | ............... F23Q 7/00 |

(Continued)

OTHER PUBLICATIONS

Office Action issued in corresponding Korean Patent Application No. 10-2014-0144156, dated Mar. 18, 2017 (English translation provided.).

*Primary Examiner* — Eric S McCall
*Assistant Examiner* — Mohammed E Keramet-Amircola
(74) *Attorney, Agent, or Firm* — Kusner & Jaffe

(57) ABSTRACT

A combustion pressure sensor having a tubular housing extending in an axial direction DX, a displacement member disposed within the housing, and a tubular connection member which elastically connects the displacement member to the housing. The combustion pressure sensor has a housing weld W1 that connects the housing and the connection member At least a circumferential portion of the housing weld is a bulge housing weld RW1 which bulges in a radial direction DR.

20 Claims, 7 Drawing Sheets

(51) Int. Cl.
*G01L 7/00* (2006.01)
*G01L 23/08* (2006.01)

(56) References Cited

U.S. PATENT DOCUMENTS

| | | | | |
|---|---|---|---|---|
| 4,909,071 A | * | 3/1990 | Amano | G01L 23/22 73/114.19 |
| 4,969,353 A | * | 11/1990 | Steinke | G01L 23/22 73/114.19 |
| 5,315,875 A | * | 5/1994 | Benedikt | G01L 23/18 338/4 |
| 5,726,351 A | * | 3/1998 | Glaser | G01L 23/222 313/323 |
| 6,094,990 A | * | 8/2000 | Lykowski | G01L 23/22 73/35.12 |
| 2010/0186490 A1 | * | 7/2010 | Burrows | G01L 23/222 73/114.19 |
| 2015/0048066 A1 | | 2/2015 | Maeda et al. | 219/121.64 |

FOREIGN PATENT DOCUMENTS

| | | | | |
|---|---|---|---|---|
| WO | WO 8301093 A1 | * | 3/1983 | F02P 19/02 |
| WO | WO 2006/072514 A1 | | 7/2006 | G01L 23/10 |
| WO | WO 2009/053170 A1 | | 4/2009 | F23Q 7/00 |
| WO | WO 2013/157269 A1 | | 10/2013 | F23Q 7/00 |

\* cited by examiner

COMBUSTION PRESSURE SENSOR AND METHOD OF MANUFACTURING THE SAME

BACKGROUND OF THE INVENTION

The present invention relates to a combustion pressure sensor which includes a housing, a displacement member which is displaced with pressure received from an axially forward side, and a connection member which elastically connects the housing and the displacement member, and to a glow plug with combustion pressure sensor. The invention also relates to methods of manufacturing the combustion pressure sensor and the glow plug with combustion pressure sensor.

A known combustion pressure sensor detects combustion pressure of an internal combustion engine such as a diesel engine.

For example, International Publication No. WO/2006/072514 discloses such a combustion pressure sensor (glow plug with combustion pressure sensor) having a tubular plug body (housing), a heater member (displacement member) which receives combustion pressure of an internal combustion engine and is displaced in the axial direction of the plug body with the combustion pressure, and a tubular membrane (connection member) which is welded to the heater member and to the plug body and holds the heater member in an axially elastic manner. FIG. 3 of International Publication No. WO/2006/072514 shows a combustion pressure sensor in which a membrane 36 and a heater member 38 are welded through a weld 58, and the membrane 36 and a plug body 12 are welded through a weld 62.

In a condition before welding, the housing and the connection member, or the displacement member and the connection member may radially separate from each other at least partially in a circumferential direction due to the difference in diameter therebetween.

In this condition, when an energy beam is radiated toward the connection member from outside the connection member in order to weld the connection member and the housing, molten metal derived from the connection member and the housing is consumed in filling a gap therebetween. As a result, the amount of metal of the weld for welding the connection member and the housing reduces, potentially resulting in a failure to firmly weld the members. Similarly, in welding the connection member and the displacement member, molten metal derived from the connection member and the displacement member is consumed in filling a gap therebetween. As a result, the amount of metal of the weld for welding the members reduces, potentially resulting in a failure to firmly weld the members.

The present invention has been conceived in view of the above problem, and an object of the invention is to provide a combustion pressure sensor in which a connection member and a housing, or a connection member and a displacement member are firmly welded and to provide a glow plug with combustion pressure sensor, or a combustion pressure sensor which doubles as a glow plug, as well as a method of manufacturing the combustion pressure sensor and a method of manufacturing the glow plug with combustion pressure sensor.

SUMMARY OF THE INVENTION (1) According to a first aspect of the present invention, there is provided a combustion pressure sensor comprising a tubular housing extending in an axial direction; a displacement member at least a portion of which is disposed within the housing and which is displaced in the axial direction with pressure received from a forward side in the axial direction; and a tubular connection member which elastically connects the displacement member to the housing. The combustion pressure sensor has a housing weld which is formed by energy-beam-welding the housing and the connection member annularly in a circumferential direction of the housing and the connection member while the housing and the connection member are separated from each other at least partially in the circumferential direction; which contains metal components derived from the housing and metal components derived from the connection member; and which includes, in a longitudinal section of the combustion pressure sensor, a wedged weld resulting from wedgewise melting of a portion of the housing. At least a portion in the circumferential direction of the housing weld is a bulge housing weld which bulges, with respect to a first adjacent portion, in a direction directed from a second adjacent portion toward the first adjacent portion along a radial direction, where the first adjacent portion is a portion of the connection member adjacent to the housing weld, and the second adjacent portion is a portion of the housing adjacent to the housing weld.

In the above-mentioned combustion pressure sensor, at least a circumferential portion of the housing weld is the bulge housing weld. The bulge housing weld has such a sufficient amount of weld metal as to bulge for welding the connection member and the housing. Thus, in a region where the housing weld assumes the form of the bulge housing weld, weld metal sufficiently reaches into a gap formed between the connection member and the housing; therefore, the connection member and the housing are firmly welded through the bulge housing weld.

The housing weld assumes not only a form in which a circumferential portion of the housing weld is the bulge housing weld, but also a form in which the housing weld is the bulge housing weld along the entire circumference thereof. Whether or not the housing weld is the bulge housing weld can be easily determined from, for example, an axially taken longitudinal section of the combustion pressure sensor.

Also, the housing weld assumes, for example, a form of welding the housing and an end portion of the connection member and a form of welding the housing and a portion of the connection member located axially inward of the end of the connection member. The expression "in a direction directed from a second adjacent portion toward a first adjacent portion" corresponds to "radially outward" in the case where the connection member is located radially outward of the housing. By contrast, the expression corresponds to "radially inward" in the case where the connection member is located radially inward of the housing.

Also, "the housing weld which includes, in a longitudinal section of the combustion pressure sensor, a wedged weld resulting from wedgewise melting of a portion of the housing" is formed, for example, in the following welding: the housing and an unwelded connection member, which is the connection member before welding, are disposed to radially overlap each other; then, the unwelded connection member is directly irradiated with an energy beam from a radial direction to weld the housing and the connection member. That portion of the unwelded connection member which is directly irradiated with the energy beam melts across its entire thickness in the radial direction, and that portion of the housing which radially faces the unwelded connection member partially melts. In the housing, the amount of melting by the energy beam reduces radially inward. Therefore, energy beam welding forms the housing weld which assumes the above-mentioned forms.

Examples of energy beam welding include welding by use of a laser beam or an electron beam.

(2) In accordance with a second aspect of the present invention, there is provided a combustion pressure sensor as described in paragraph (1), wherein the housing weld is the bulge housing weld along the entire circumference thereof in the circumferential direction.

In the above-mentioned combustion pressure sensor, since the housing weld is the bulge housing weld along the entire circumference thereof in the circumferential direction, the connection member and the housing can be firmly welded along the entire circumference.

(3) In accordance with a third aspect of the present invention, there is provided a combustion pressure sensor as described in paragraph (1) or (2), wherein the housing weld welds the housing and an end portion of the connection member.

In the above-mentioned combustion pressure sensor, since the housing and an end portion of the connection member are welded at the housing weld, the condition of welding at the housing weld can be easily inspected from outside through, for example, visual inspection.

(4) In accordance with a fourth aspect of the present invention, there is provided a combustion pressure sensor as described in paragraph (1) or (2), wherein the combustion pressure sensor is configured such that the housing weld welds the housing and a portion of the connection member separated from an end thereof in the axial direction.

In the above-mentioned combustion pressure sensor, since the housing and a portion of the connection member separated from an end thereof in the axial direction are welded at the housing weld, it is unnecessary to secure the welding position accuracy of the housing weld, and the housing and the connection member can be connected together without fail.

(5) In accordance with a fifth aspect of the present invention, there is provided a combustion pressure sensor as described in paragraph (4), wherein a dimension of the housing weld in the axial direction measured in a space between the housing and the connection member separated from each other is greater than that measured in the housing and that measured in the connection member.

In the above-mentioned combustion pressure sensor, since the housing weld has a large axial dimension in the space between the housing and the connection member separated from each other, the strength of joint between the housing and the connection member can be increased further.

(6) In accordance with a sixth aspect of the present invention, there is provided a combustion pressure sensor as described in any of paragraphs (1) to (5), wherein the housing weld is composed of metal components derived from the housing and metal components derived from the connection member.

In the above-mentioned combustion pressure sensor, the housing weld is composed of metal components derived from the housing and metal components derived from the connection member. That is, the housing weld does not contain other metal components such as a filler metal and is formed by melting only the connection member and the housing. Thus, other metal materials such as a filler metal are not required; accordingly, an inexpensive combustion pressure sensor is yielded.

(7) In accordance to a seventh aspect of the present invention, there is provided a combustion pressure sensor comprising a tubular housing extending in an axial direction; a displacement member at least a portion of which is disposed within the housing and which is displaced in the axial direction with pressure received from a forward side in the axial direction; and a tubular connection member which elastically connects the displacement member to the housing. The combustion pressure sensor has a displacement member weld which is formed by energy-beam-welding the displacement member and the connection member annularly in a circumferential direction of the displacement member and the connection member while the displacement member and the connection member are separated from each other at least partially in the circumferential direction; which contains metal components derived from the displacement member and metal components derived from the connection member; and which includes, in a longitudinal section of the combustion pressure sensor, a wedged weld resulting from wedgewise melting of a portion of the displacement member. At least a portion in the circumferential direction of the displacement member weld is a bulge displacement member weld which bulges, with respect to a third adjacent portion, in a direction directed from a fourth adjacent portion toward the third adjacent portion along a radial direction, where the third adjacent portion is a portion of the connection member adjacent to the displacement member weld, and the fourth adjacent portion is a portion of the displacement member adjacent to the displacement member weld.

In the above-mentioned combustion pressure sensor, at least a circumferential portion of the displacement member weld is the bulge displacement member weld. The bulge displacement member weld has such a sufficient amount of weld metal as to bulge for welding the connection member and the displacement member. Thus, in a region where the displacement member weld assumes the form of the bulge displacement member weld, weld metal sufficiently reaches into a gap formed between the connection member and the displacement member; therefore, the connection member and the displacement member are firmly welded through the bulge displacement member weld.

The displacement member weld assumes not only a form in which a circumferential portion of the displacement member weld is the bulge displacement member weld, but also a form in which the displacement member weld is the bulge displacement member weld along the entire circumference thereof. Whether or not the displacement member weld is the bulge displacement member weld can be easily determined from, for example, an axially taken longitudinal section of the combustion pressure sensor.

Also, the displacement member weld assumes, for example, a form of welding the displacement member and an end portion of the connection member and a form of welding the displacement member and a portion of the connection member located axially inward of the end of the connection member. The expression "in a direction directed from a fourth adjacent portion toward a third adjacent portion" corresponds to "radially outward" in the case where the connection member is located radially outward of the displacement member. By contrast, the expression corresponds to "radially inward" in the case where the connection member is located radially inward of the displacement member.

Also, "the displacement member weld which includes, in a longitudinal section of the combustion pressure sensor, a wedged weld resulting from wedgewise melting of a portion of the displacement member" is formed, for example, in the following manner: the displacement member and an unwelded connection member are disposed to radially overlap each other; then, the unwelded connection member is directly irradiated with an energy beam from a radial direction to weld the connection member and the displacement member. That portion of the unwelded connection member which is directly irradiated with the energy beam melts across its entire thickness in the radial direction, and that portion of the displacement member which radially faces the unwelded connection member partially melts. In the displacement member, the amount of melting by the energy beam reduces radially inward. Therefore, energy beam welding forms the displacement member weld which assumes the above-mentioned forms.

(8) In accordance with an eighth aspect of the present invention, there is provided a combustion pressure sensor as described in paragraph (7), wherein the above-mentioned combustion pressure sensor, the displacement member weld is the bulge displacement member weld along the entire circumference thereof in the circumferential direction.

In the above-mentioned combustion pressure sensor, since the displacement member weld is the bulge displacement member weld along the entire circumference thereof in the circumferential direction, the connection member and the displacement member can be firmly welded along the entire circumference.

(9) In accordance with a ninth aspect of the present invention, there is provided a combustion pressure sensor as described in paragraph (7) or (8), wherein the displacement member weld welds the displacement member and an end portion of the connection member.

In the above-mentioned combustion pressure sensor, since the displacement member and an end portion of the connection member are welded at the displacement member weld, the condition of welding at the displacement member weld can be easily inspected from outside through, for example, visual inspection.

(10) In accordance with a tenth aspect of the present invention, there is provided a combustion pressure sensor as described in paragraph (7) or (8), wherein the combustion pressure sensor may be configured such that the displacement member weld welds the displacement member and a portion of the connection member separated from an end thereof in the axial direction.

In the above-mentioned combustion pressure sensor, since the displacement member and a portion of the connection member separated from an end thereof in the axial direction are welded at the displacement member weld, it is unnecessary to secure the welding position accuracy of the displacement member, and the displacement member and the connection member can be connected together without fail.

(11) In accordance with an eleventh aspect of the present invention, there is provided a combustion pressure sensor as described in paragraph (10), wherein a dimension of the displacement member weld in the axial direction measured in a space between the displacement member and the connection member is greater than that measured in the displacement member and that measured in the connection member.

In the above-mentioned combustion pressure sensor, since the displacement member weld has a large axial dimension in the space between the displacement member and the connection member separated from each other, the strength of joint between the displacement member and the connection member can be increased further.

(12) In accordance with a twelfth aspect of the present invention, there is provided a combustion pressure sensor as described in any of paragraphs (7) to (11), wherein the displacement member weld is composed of metal components derived from the displacement member and metal components derived from the connection member.

In the above-mentioned combustion pressure sensor, the displacement member weld is composed of metal components derived from the displacement member and metal components derived from the connection member. That is, the displacement member weld does not contain other metal components such as a filler metal and is formed by melting only the connection member and the displacement member. Thus, other metal materials such as a filler metal are not required; accordingly, an inexpensive combustion pressure sensor is yielded.

(13) In accordance with a thirteenth aspect of the present invention, there is provided a combustion pressure sensor as described in any of paragraphs (1) to (12), wherein the combustion pressure sensor is a glow plug with combustion pressure sensor in which the displacement member is a heater member disposed in the housing such that a forward end portion thereof protrudes from a forward end of the housing.

Any one of the above-mentioned combustion pressure sensors is a glow plug with combustion pressure sensor in which the displacement member is a heater member. Therefore, the combustion pressure sensor can also assist start-up of an internal combustion engine such as a diesel engine, in addition to detection of combustion pressure.

Examples of the heater member include a metal heater in which a coiled heat generating member is disposed within a metal tube, and a ceramic heater in which a heat generating element formed of electrically conductive ceramic is disposed within an electrically insulating ceramic element and to which an outer tube of metal is externally fitted.

(14) According to a fourteenth aspect of the present invention, there is provided a method of manufacturing a combustion pressure sensor which comprises a tubular housing extending in an axial direction; a displacement member at least a portion of which is disposed within the housing and which is displaced in the axial direction with pressure received from a forward side in the axial direction; and a tubular connection member which elastically connects the displacement member to the housing. The combustion pressure sensor has a housing weld which is formed by energy-beam-welding the housing and the connection member annularly in a circumferential direction of the housing and the connection member while the housing and the connection member are separated from each other at least partially in the circumferential direction; which contains metal components derived from the housing and metal components derived from the connection member; and which includes, in a longitudinal section of the combustion pressure sensor, a wedged weld resulting from wedgewise melting of a portion of the housing. At least a portion in the circumferential direction of the housing weld is a bulge housing weld which bulges, with respect to a first adjacent portion, in a direction directed from a second adjacent portion toward the first adjacent portion along a radial direction, where the first adjacent portion is a portion of the connection member adjacent to the housing weld, and the second adjacent portion is a portion of the housing adjacent to the housing weld. The method comprises a housing welding step of welding the connection member and the housing annularly in the circumferential direction by disposing the housing and an unwelded connection member to overlap each other in the radial direction, and irradiating the unmolten connection member with an energy beam to form the housing weld.

The above-mentioned method of manufacturing a combustion pressure sensor forms, in the housing welding step, the housing weld at least a portion of which is the bulge housing weld having a sufficient amount of weld metal for welding the housing and the connection member by irradiating the unwelded connection member with an energy beam. Therefore, the method can manufacture the combustion pressure sensor in which the housing and the connection member are firmly welded through the bulge housing weld.

Examples of an energy beam include a laser beam and an electron beam.

Furthermore, in the method of manufacturing a combustion pressure sensor described in paragraph (14), preferably, the housing weld welds the housing and an end portion of the connection member, and, in the housing welding step, the connection member and the housing are welded by disposing the housing and an unmolten end portion of the unwelded connection member to overlap each other in the radial direction, and irradiating the unmolten end portion with an energy beam to melt the unmolten end portion.

According to this method of manufacturing a combustion pressure sensor, since an end portion of the connection member is welded to the housing by melting the unmolten end portion of the unwelded connection member, the condition of welding at the housing weld can be easily inspected from outside through, for example, visual inspection. Therefore, a reliable combustion pressure sensor can be manufactured.

(15) In accordance with a fifteenth aspect of the present invention, there is provided a method of manufacturing a combustion pressure sensor as described in paragraph (14), wherein in the housing welding step, the unmolten end portion of the unwelded connection member is irradiated with the energy beam at an inward end portion located away from an end of the unmolten end portion.

According to the above-mentioned method of manufacturing a combustion pressure sensor, in the housing welding step, the unmolten end portion is irradiated with the energy beam at the inward end portion. Thus, in the unmolten end portion, the inward end portion and a portion located on a side toward the end with respect to (located outward of) the inward end portion are melted to thereby form the housing weld. Therefore, the method can easily manufacture the combustion pressure sensor having the housing weld at least a portion of which is the bulge housing weld.

(16) In accordance with a sixteenth aspect of the present invention, there is provided a method of manufacturing a combustion pressure sensor as described in paragraph (14) or (15), wherein the unwelded connection member is such that the unmolten end portion is thicker than an end adjacent portion adjacent to the unmolten end portion.

In the above-mentioned method of manufacturing a combustion pressure sensor, the unmolten end portion of the unwelded connection member is thicker than the end adjacent portion adjacent to the unmolten end portion. Thus, in the housing welding step, the thick unmolten end portion is irradiated with an energy beam to thereby be melted for forming the housing weld. Therefore, the method can easily manufacture the combustion pressure sensor having the housing weld at least a portion of which is the bulge housing weld.

Alternatively, in the method of manufacturing a combustion pressure sensor described in paragraph (14), preferably, the housing weld welds the housing and a portion of the connection member separated from an end thereof in the axial direction, and in the housing welding step, welding is performed in such a manner that the end of the unwelded connection member remains.

In this method of manufacturing a combustion pressure sensor, since welding is performed in such a manner that the end of the unwelded connection member remains, it is unnecessary to secure the welding position accuracy of the housing weld. Therefore, the housing and the connection member can be connected easily.

Furthermore, preferably, in the method of manufacturing a combustion pressure sensor described in paragraph (14) or described above, a dimension of the housing weld in the axial direction measured in a space between the housing and the connection member separated from each other is greater than that measured in the housing and that measured in the connection member.

In the above-mentioned method of manufacturing a combustion pressure sensor, since a housing weld having a large axial dimension in the space between the housing and the connection member separated from each other can be formed, the strength of joint between the housing and the connection member can be increased further.

(17) According to a seventeenth aspect of the present invention, there is provided a method of manufacturing a combustion pressure sensor which comprises a tubular housing extending in an axial direction; a displacement member at least a portion of which is disposed within the housing and which is displaced in the axial direction with pressure received from a forward side in the axial direction; and a tubular connection member which elastically connects the displacement member to the housing. The combustion pressure sensor has a displacement member weld which is formed by energy-beam-welding the displacement member and the connection member annularly in a circumferential direction of the displacement member and the connection member while the displacement member and the connection member are separated from each other at least partially in the circumferential direction; which contains metal components derived from the displacement member and metal components derived from the connection member; and which includes, in a longitudinal section of the combustion pressure sensor, a wedged weld resulting from wedgewise melting of a portion of the displacement member. At least a portion in the circumferential direction of the displacement member weld is a bulge displacement member weld which bulges, with respect to a third adjacent portion, in a direction directed from a fourth adjacent portion toward the third adjacent portion along a radial direction, where the third adjacent portion is a portion of the connection member adjacent to the displacement member weld, and the fourth adjacent portion is a portion of the displacement member adjacent to the displacement member weld. The method comprises a displacement member welding step of welding the connection member and the displacement member annularly in the circumferential direction by disposing the displacement member and an unmolten end portion of an unwelded connection member to overlap each other in the radial direction, and irradiating the unmolten end portion with an energy beam to melt the unmolten end portion for forming the displacement member weld.

The above-mentioned method of manufacturing a combustion pressure sensor forms, in the displacement member welding step, the displacement member weld at least a portion of which is the bulge displacement member weld having a sufficient amount of weld metal for welding the connection member and the displacement member as a result of the unmolten end portion of the unwelded connection member being melted through irradiation with an energy beam. Therefore, the method can manufacture the combustion pressure sensor in which the connection member and the displacement member can be firmly welded through the bulge displacement member weld.

Furthermore, in the method of manufacturing a combustion pressure sensor described in paragraph (17), preferably, the displacement member weld welds the displacement member and an end portion of the connection member, and, in the displacement member welding step, the connection member and the displacement member are welded by disposing the displacement member and an unmolten end portion of an unwelded connection member to overlap each other in the radial direction, and irradiating the unmolten end portion with an energy beam to melt the unmolten end portion.

According to this method of manufacturing a combustion pressure sensor, since an end portion of the connection member is welded to the displacement member by melting the unmolten end portion of the unwelded connection member, the condition of welding at the displacement member weld can be easily inspected from outside through, for example, visual inspection. Therefore, a reliable combustion pressure sensor can be manufactured.

(18) In accordance with an eighteenth aspect of the present invention, there is provided a method of manufacturing a combustion pressure sensor as described in paragraph (17), wherein in the displacement member welding step, the unmolten end portion of the unwelded connection member is irradiated with the energy beam at an inward end portion located away from an end of the unmolten end portion.

According to the above-mentioned method of manufacturing a combustion pressure sensor, in the displacement member welding step, the unmolten end portion is irradiated with the energy beam at the inward end portion. Thus, in the unmolten end portion, the inward end portion and a portion located on a side toward the end with respect to (located outward of) the inward end portion are melted to thereby form the displacement member weld. Therefore, the method can easily manufacture the combustion pressure sensor having the displacement member weld at least a portion of which is the bulge displacement member weld.

(19) In accordance with a nineteenth aspect of the present invention, there is provided a method of manufacturing a combustion pressure sensor as described in paragraph (17) or (18), wherein the unwelded connection member is such that the unmolten end portion is thicker than an end adjacent portion adjacent to the unmolten end portion.

In the above-mentioned methods of manufacturing a combustion pressure sensor, the unmolten end portion of the unwelded connection member is thicker than the end adjacent portion adjacent to the unmolten end portion. Thus, in the displacement member welding step, the thick unmolten end portion is irradiated with an energy beam to thereby be melted for forming the displacement member weld. Therefore, the method can easily manufacture the combustion pressure sensor having the displacement member weld at least a portion of which is the bulge displacement member weld.

Alternatively, in the method of manufacturing a combustion pressure sensor described in paragraph (17), preferably, the displacement member weld welds the displacement member and a portion of the connection member separated from an end thereof in the axial direction, and, in the displacement member welding step, welding is performed in such a manner that the end of the unwelded connection member remains.

In this method of manufacturing a combustion pressure sensor, since welding is performed in such a manner that the end of the unwelded connection member remains, it is unnecessary to secure the welding position accuracy of the displacement member weld. Therefore, the displacement member and the connection member can be connected easily.

Furthermore, preferably, in the method of manufacturing a combustion pressure sensor described in paragraph (17) or described above, a dimension of the displacement member weld in the axial direction measured in a space between the displacement member and the connection member separated from each other is greater than that measured in the displacement member and that measured in the connection member.

In the above-mentioned method of manufacturing a combustion pressure sensor, since a displacement member weld having a large axial dimension in the space between the displacement member and the connection member separated from each other can be formed, the strength of joint between the displacement member and the connection member can be increased further.

(20) In accordance with a twentieth aspect of the present invention, there is provided a method of manufacturing a combustion pressure sensor as described in any of paragraphs (14) to (19), wherein the displacement member is a heater member disposed in the housing such that a forward end portion thereof protrudes from a forward end of the housing.

In the above-mentioned methods of manufacturing a combustion pressure sensor, the displacement member is the heater member; thus, the method can reliably manufacture the glow plug with combustion pressure sensor which assists start-up of an internal combustion engine such as a diesel engine and can also be utilized as a combustion pressure sensor.

DETAILED DESCRIPTION OF THE PREFERRED EMBODIMENTS

Figure 1:
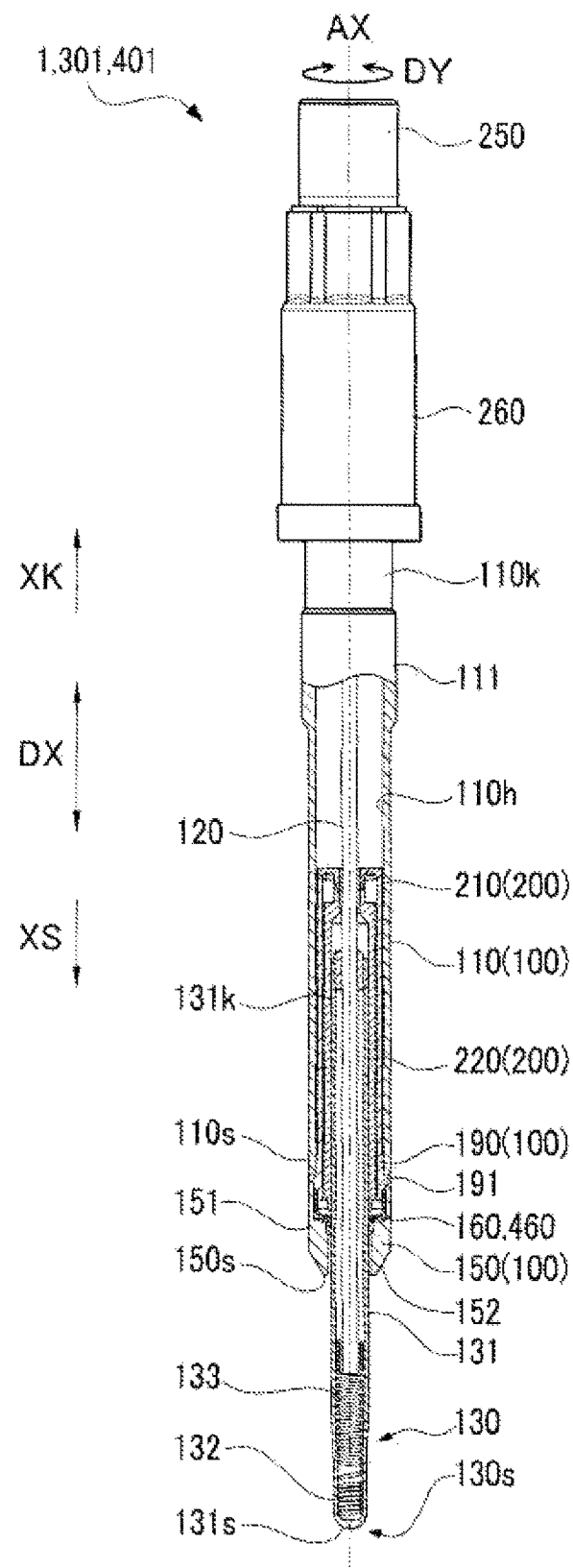
FIG. 1 is a partially cutaway sectional view showing the whole glow plug with combustion pressure sensor according to an embodiment and first and second modified embodiments of the present invention.
Figure 2:
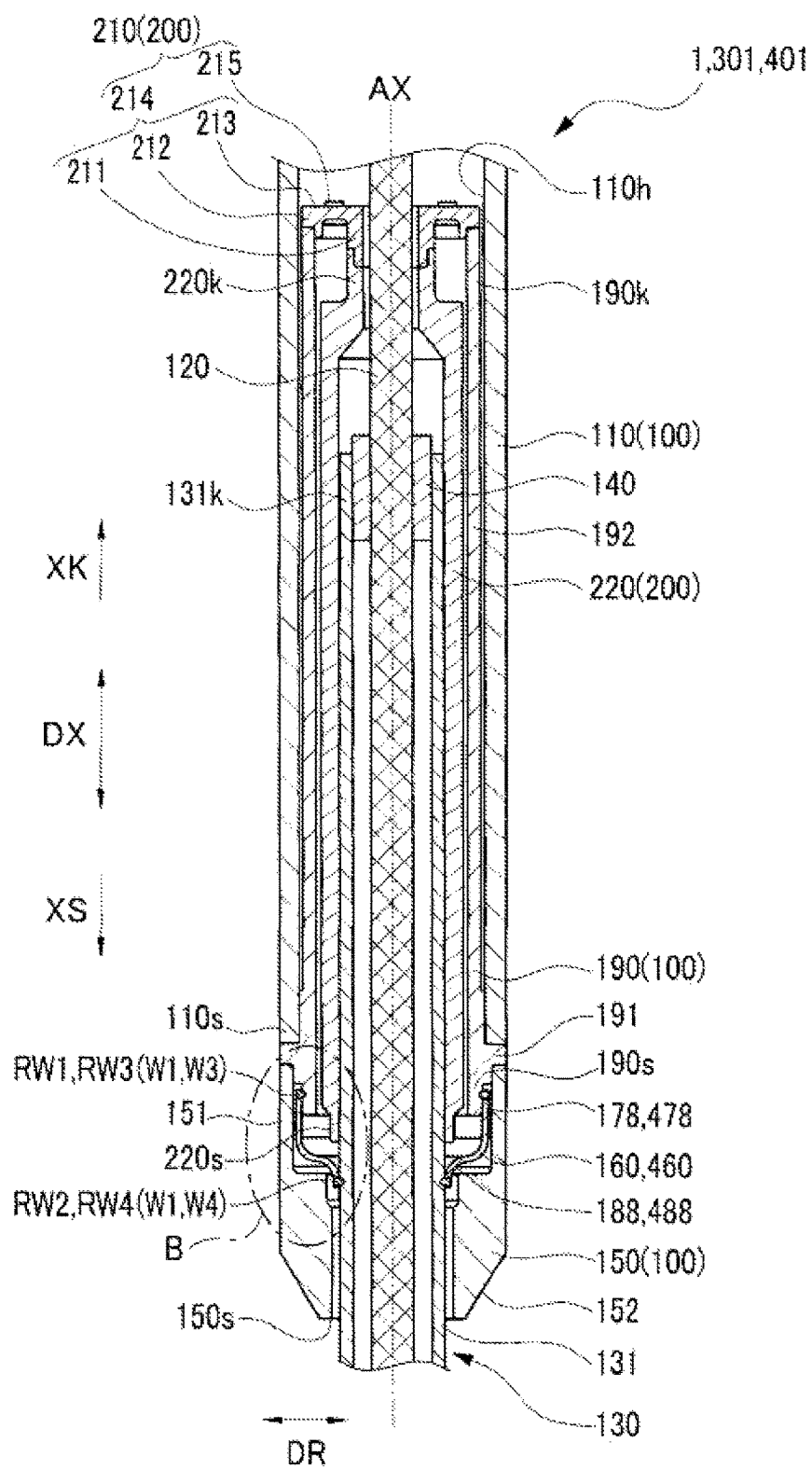
FIG. 2 is a fragmentary, enlarged sectional view (longitudinal sectional view) showing a pressure sensor section and its vicinity of the glow plug with combustion pressure sensor according to the embodiment and the first and second modified embodiments.
Figure 3:
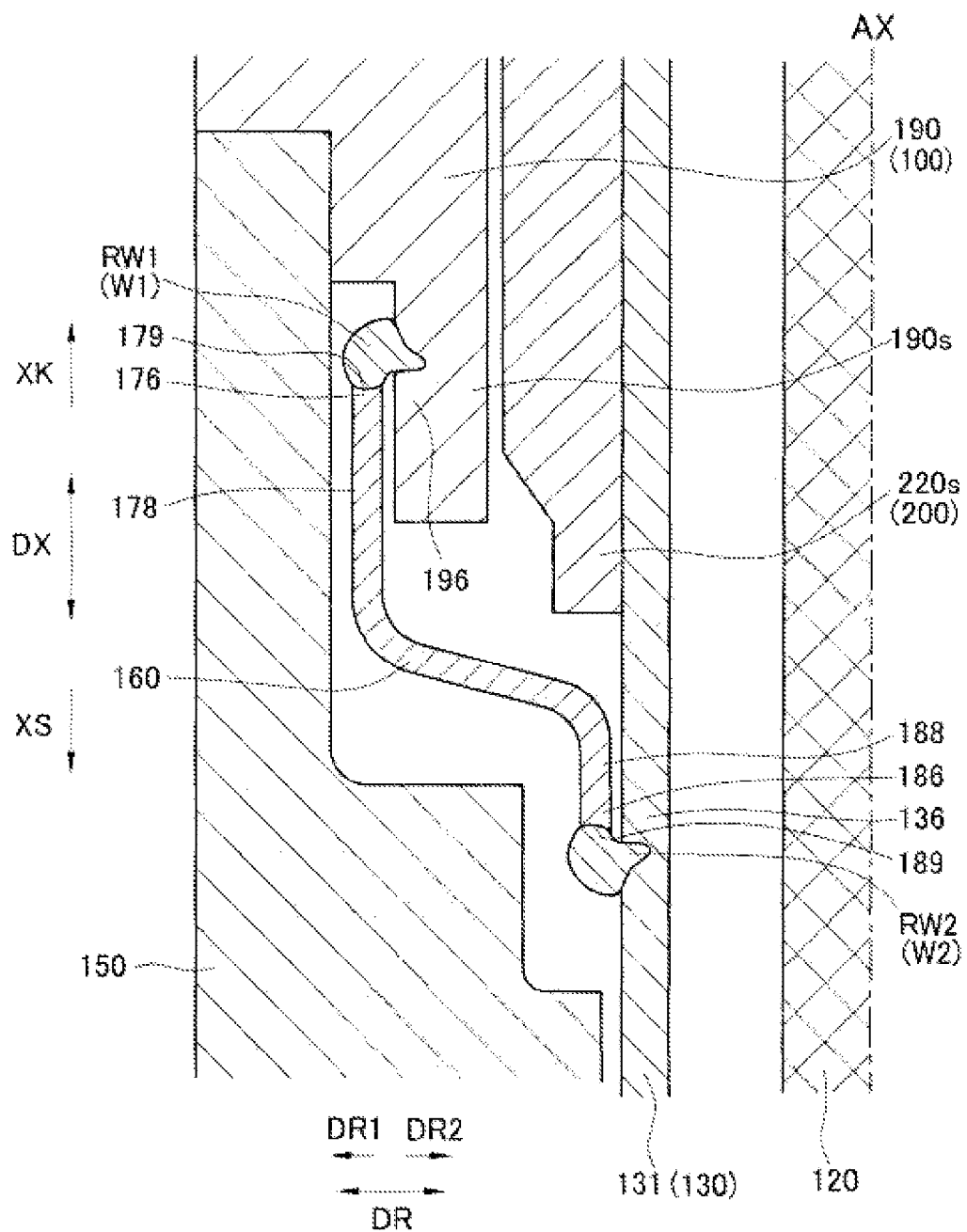
FIG. 3 is a fragmentary, enlarged sectional view (longitudinal sectional view) showing a membrane and its vicinity (zone B in FIG. 2) of the glow plug with combustion pressure sensor according to the embodiment and the first modified embodiment.

First, a glow plug with combustion pressure sensor 1 (hereinafter, may be referred to merely as the glow plug 1) according to an embodiment of the present invention will be described with reference to FIGS. 1 to 3. FIG. 1 is a fragmentary, enlarged sectional view showing the whole glow plug 1. FIG. 2 is a fragmentary, enlarged sectional view (longitudinal sectional view) showing, on a further enlarged scale, a pressure sensor section 200 and its vicinity of FIG. 1. FIG. 3 is a fragmentary, enlarged sectional view (longitudinal sectional view) showing, on a further enlarged scale, a membrane 160 and its vicinity (zone B in FIG. 2) of FIG. 2. In the following description, in an axial direction DX along an axial line AX of the glow plug 1 in FIGS. 1 to 3, a side toward a heater member 130 (lower side in the drawings) is referred to as the forward side XS, and an opposite side (upper side in the drawings) is referred to as the rear side XK.

The glow plug 1 includes a tubular housing 100 extending in the axial direction DX. The rodlike heater member 130 whose forward end portion (a heater forward end portion 130s, which will be described later) protrudes from a forward end (a forward end cap 150, which will be described later) of the housing 100. The tubular membrane 160 elastically connects the heater member 130 to the housing 100. The glow plug 1 further includes a center rod 120 located on the axial line AX of the glow plug 1 and electrically communicating with the heater member 130; a terminal assembly 250; and the pressure sensor section 200.

The pressure sensor section 200 has a sensor body 210 and a transmission sleeve 220 (see FIG. 2). The sensor body 210 includes an annular diaphragm 214 of metal, and a pressure detection element 215 disposed on the diaphragm 214 and formed of a piezoresistance element. The diaphragm 214 is composed of a substantially cylindrical inner circumferential portion 211, a substantially cylindrical outer circumferential portion 212, and a thin annular diaphragm portion 213 extending therebetween in a bridging manner. The sensor body 210 allows the center rod 120 to be inserted therethrough in a space located inward, in a radial direction DR, of the inner circumferential portion 211. The pressure detection element 215 is disposed on that main surface of the diaphragm portion 213 which is located on the rear side XK in the axial direction DX. The pressure detection element 215 may be, for example, a piezoelectric element in place of the above-mentioned piezoresistance element.

Meanwhile, the transmission sleeve 220 is formed into a substantially cylindrical shape from a metal material and is externally fitted to a sheath tube 131 (which will be described later) of the heater member 130. The transmission sleeve 220 is welded, at its sleeve forward-end portion 220s located on the forward side XS, to the outer circumferential surface of the sheath tube 131 to thereby be united to the heater member 130. Also, a sleeve rear-end portion 220k, located on the rear side XK, of the transmission sleeve 220 is joined to the inner circumferential portion 211 of the sensor body 210. Thus, displacement in the axial direction DX of the heater member 130 is transmitted to the inner circumferential portion 211 of the sensor body 210 through the transmission sleeve 220, and the diaphragm portion 213 of the diaphragm 214 is thereby deformed, whereby combustion pressure is detected.

The terminal assembly 250 has a tubular terminal cover 260 of metal and an external terminal member (not shown) disposed within the terminal cover 260. The external terminal member establishes electrical communication between an external device and the center rod 120 located within the glow plug 1.

The center rod 120 is a circular columnar rodlike member formed of carbon steel. The center rod 120 is disposed in the glow plug 1 along the axial line AX, and about half of the center rod 120 on the forward side XS in the axial direction DX is inserted into the sheath tube 131 of the heater member 130 (see FIG. 1), which will be described later. The center rod 120 electrically communicates with a control coil 133 (which will be described later) of the heater member 130. In the present embodiment, the center rod 120 may be formed of, for example, stainless steel.

A gap in the radial direction DR between the center rod 120 and the sheath tube 131 is filled with unillustrated insulating powder, and the center rod 120 and the sheath tube 131 are united through the insulating powder. An annular rubber 140 is disposed between the center rod 120 and a tube rear-end portion 131k of the sheath tube 131 to thereby maintain a gap therebetween; provide electrical insulation therebetween; and airtightly seal the gap (see FIG. 2).

The housing 100 has a metallic shell 110, an inner tube 190, and a forward end cap 150.

The metallic shell 110 is formed of a metal material and assumes a cylindrical shape extending in the axial direction DX from its metallic-shell forward end portion 110s to its metallic-shell rear end portion 110k. The metallic shell 110 has an axial hole 110h extending therethrough. The metallic shell 110 also has an externally threaded portion 111 formed on its outer circumferential surface on the rear side XK in the axial direction DX and used for the purpose of mounting.

Meanwhile, the inner tube 190 is formed of stainless steel and has a substantially cylindrical inner-tube body 192; a jaw-like flange portion 191 located at the forward side XS in the axial direction DX of the inner-tube body 192; and a forward end portion 190s located on the forward side XS with respect to the flange portion 191 (see FIG. 2). The inner-tube body 192 is concentrically disposed in the axial hole 110h of the metallic shell 110 on the forward side XS in the axial direction DX. The flange portion 191 protrudes outward in the radial direction DR; has the same outside diameter as that of the metallic-shell forward end portion 110s of the metallic shell 110; and is welded to the metallic-shell forward end portion 110s. The outer circumferential portion 212 of the sensor body 210 is welded to that rear end portion 190k of the inner tube 190 which is located on the rear side XK in the axial direction DX of the inner-tube body 192.

The forward end cap 150 is formed of a metal material and has a cylindrical portion 151 assuming the form of a cylinder on its rear side XK. The cylindrical portion 151 is externally fitted to the forward end portion 190s of the inner tube 190 and is welded to the flange portion 191 of the inner tube 190.

The cylindrical portion 151 accommodates therein the membrane 160 which connects the heater member 130 and the inner tube 190. Specifically, after the membrane 160 is welded to the forward end portion 190s of the inner tube 190 and to the sheath tube 131 of the heater member 130, the forward end cap 150 is externally fitted to the forward end portion 190s of the inner tube 190 and is welded to the flange portion 191.

The forward end cap 150 has, on the forward side XS, a taper portion 152 whose diameter reduces toward a forward end 150s. When the glow plug 1 is mounted to an internal combustion engine, the taper portion 152 comes in close contact with a predetermined seat surface of a plug mounting hole (not shown) of the internal combustion engine, thereby securing airtightness of a combustion chamber.

The heater member 130 is a sheath heater configured such that a heat generating coil 132 and a control coil 133 are disposed within the tubular sheath tube 131 (see FIG. 1).

The sheath tube 131 is formed of stainless steel and has a tube forward end portion 131s which is located on the forward side XS in the axial direction DX and is hemispherically closed. The sheath tube 131 accommodates therein the heat generating coil 132 internally joined to the abovementioned tube forward end portion 131s, and the control coil 133 connected in series to the rear end of the heat generating coil 132.

That inner space of the sheath tube 131 in which the heat generating coil 132 and the control coil 133 are disposed is filled with insulating powder (not shown) such as magnesium oxide powder. Also, the aforementioned center rod 120 is inserted into the sheath tube 131 along the axial line AX.

The membrane 160 is a two-step cylindrical member which is formed of a nickel alloy and is elastic in the axial direction DX. Specifically, the membrane 160 has a forward tube portion 188 located on the forward side XS in the axial direction DX and having a relatively small diameter, and a rear tube portion 178 located on the rear side XK and having a diameter larger than that of the forward tube portion 188. For example, the rear tube portion 178 can elastically move in the axial direction DX in relation to the forward tube portion 188. Thus, through welding of the heater member 130 to the forward tube portion 188 of the membrane 160 and welding of the housing 100 to the rear tube portion 178 of the membrane 160, the heater member 130 can be elastically connected to the housing 100 through the membrane 160. As a result, the heater member 130 can be displaced in the axial direction DX with pressure received from the forward side XS in the axial direction DX.

The glow plug 1 of the present embodiment has an annular housing weld W1 which welds the rear tube portion 178 of the membrane 160 and the forward end portion 190s of the inner tube 190 of the housing 100, and an annular heater weld W2 which welds the forward tube portion 188 of the membrane 160 and the sheath tube 131 of the heater member 130.

The housing weld W1 annularly welds the forward end portion 190s of the inner tube 190 and the rear end portion 178 of the membrane 160 along their entire circumference in the circumferential direction DY through laser beam welding, which will be described later. In a longitudinal section of the glow plug 1 taken along the axial line AX, the housing weld W1 is such that the rear tube portion 178 of the membrane 160 is melted across its entire thickness in the radial direction DR and such that a portion of the forward end portion 190s of the inner tube 190 is melted. The housing weld W1 includes a wedged weld resulting from wedgewise melting, in the forward end portion 190s, toward an inward side DR2 in the radial direction DR (see FIG. 3).

Since the rear tube portion 178 of the membrane 160 is larger in diameter than the forward end portion 190s of the inner tube 190, the diametral difference causes them to separate from each other in the radial direction DR at least partially in the circumferential direction DY. However, along the entire circumference in the circumferential direction DY, the housing weld W1 assumes the form of a bulge housing weld RW1 which bulges toward an outward side DR1 in the radial direction DR with respect to a rear-end adjacent portion 176, adjacent to the housing weld W1, of the rear tube portion 178 of the membrane 160. The outward side DR1 in the radial direction DR corresponds to a direction directed from an inner-tube adjacent portion 196 to the rear-end adjacent portion 176 along the radial direction DR, where the inner-tube adjacent portion 196 is that portion of the forward end portion 190s of the inner tube 190 which is adjacent to the housing weld W1 (see FIG. 3).

Additionally, in the present embodiment, the bulge housing weld RW1 (housing weld W1) is formed along a rear end portion 179, located on the rear side XK in the axial direction DX, of the rear tube portion 178 of the membrane 160 and welds the rear end portion 179 and the housing 100 (the forward end portion 190s of the inner tube 190). Namely, the bulge housing weld RW1 (housing weld W1) forms an end of the membrane 160 on the rear side XK. Also, the bulge housing weld RW1 (housing weld W1) is composed of metal components (main component: Fe; balance: Ni, Cr) derived from stainless steel used to form the forward end portion 190s of the inner tube 190, and metal components (main component: Ni; balance: Fe, Cr) derived from a nickel alloy used to form the membrane 160.

In the present embodiment, the glow plug with combustion pressure sensor (glow plug) 1 corresponds to "combustion pressure sensor"; the heater member 130 corresponds to "displacement member;" the rear-end adjacent portion 176 corresponds to "first adjacent portion;" and inner-tube adjacent portion 196 corresponds to "second adjacent portion."

In the glow plug with combustion pressure sensor 1 according to the present embodiment, as mentioned above, at least a portion in the circumferential direction DY of the housing weld W1 is the bulge housing weld RW1. The bulge housing weld RW1 has such a sufficient amount of weld metal as to bulge for welding the membrane 160 and the inner tube 190. Thus, in a region where the housing weld W1 assumes the form of the bulge housing weld RW1 (in the present embodiment, the entire housing weld W1 along the circumferential direction DY), weld metal sufficiently reaches into a gap formed between the the membrane 160 and the forward end portion 190s of the inner tube 190; therefore, the membrane 160 and the housing 100 (the forward end portion 190s of the inner tube 190) are firmly welded through the bulge housing weld RW1.

In the glow plug 1, since the housing weld W1 is the bulge housing weld RW1 along the entire circumference thereof in the circumferential direction DY, the membrane 160 and the housing 100 (the forward end portion 190s of the inner tube 190) can be firmly welded along the entire circumference.

Also, since the housing 100 (the forward end portion 190s of the inner tube 190) and the rear end portion 179 of the membrane 160 are welded at the housing weld W1, the condition of welding at the housing weld W1 can be easily inspected from outside through, for example, visual inspection.

Also, the housing weld W1 is composed of metal components (Fe, Ni, Cr) derived from stainless steel used to form the forward end portion 190s of the inner tube 190, and metal components (Ni, Fe, Cr) derived from a nickel alloy used to form the membrane 160. That is, the housing weld W1 does not contain other metal components such as a filler metal and is formed by melting only the membrane 160 and the forward end portion 190s of the inner tube 190. Thus, other metal materials such as a filler metal are not required; accordingly, an inexpensive glow plug 1 is yielded.

Meanwhile, the heater weld W2 also annularly welds the sheath tube 131 of the heater member 130 and the forward tube portion 188 of the membrane 160 along their entire circumference in the circumferential direction DY through laser beam welding. In a longitudinal section of the glow plug 1 taken along the axial line AX, the heater weld W2 is such that the forward tube portion 188 of the membrane 160 is melted across its entire thickness in the radial direction DR and such that a portion of the sheath tube 131 is melted. The heater weld W2 includes a wedged weld resulting from wedgewise melting, in the sheath tube 131, toward the inward side DR2 in the radial direction DR (see FIG. 3).

Since the forward tube portion 188 of the membrane 160 is larger in diameter than the sheath tube 131, the diametral difference causes them to separate from each other in the radial direction DR at least partially in the circumferential direction DY. However, along the entire circumference in the circumferential direction DY, the heater weld W2 assumes the form of a bulge heater weld RW2 which bulges toward the outward side DR1 in the radial direction DR with respect to a forward-end adjacent portion 186, adjacent to the heater weld W2, of the forward tube portion 188 of the membrane 160. The outward side DR1 in the radial direction DR corresponds to a direction directed from a tube adjacent portion 136 to the forward-end adjacent portion 186 along the radial direction DR, where the tube adjacent portion 136 is that portion of the sheath tube 131 which is adjacent to the heater weld W2 (see FIG. 3).

Additionally, in the present embodiment, the bulge heater weld RW2 (heater weld W2) is formed along a forward end portion 189, located on the forward side XS in the axial direction DX, of the forward tube portion 188 of the membrane 160 and welds the forward end portion 189 and the heater member 130 (sheath tube 131). Namely, the bulge heater weld RW2 (heater weld W2) forms an end of the membrane 160 on the forward side XS. Also, the bulge heater weld RW2 (heater weld W2) is composed of metal components (main component: Fe; balance: Ni, Cr) derived from stainless steel used to form the sheath tube 131, and metal components (main component: Ni; balance: Fe, Cr) derived from a nickel alloy used to form the membrane 160.

In the present embodiment, the heater weld W2 corresponds to "displacement member weld"; the bulge heater weld RW2 corresponds to "bulge displacement member weld;" the forward-end adjacent portion 186 corresponds to "third adjacent portion;" and tube adjacent portion 136 corresponds to "fourth adjacent portion."

In the glow plug with combustion pressure sensor 1 according to the present embodiment, as mentioned above, at least a portion in the circumferential direction DY of the heater weld W2 is the bulge heater weld RW2. The bulge heater weld RW2 has such a sufficient amount of weld metal as to bulge for welding the membrane 160 and the sheath tube 131. Thus, in a region where the heater weld W2 assumes the form of the bulge heater weld RW2 (in the present embodiment, the entire heater weld W2 along the circumferential direction DY), weld metal sufficiently reaches into a gap formed between the membrane 160 and the sheath tube 131; therefore, the membrane 160 and the heater member 130 (sheath tube 131) are firmly welded through the bulge heater weld RW2.

In the glow plug 1, since the heater weld W2 is the bulge heater weld RW2 along the entire circumference thereof in the circumferential direction DY, the membrane 160 and the sheath tube 131 can be firmly welded along the entire circumference.

Also, since the heater member 130 (sheath tube 131) and the forward end portion 189 of the membrane 160 are welded at the heater weld W2, the condition of welding at the heater weld W2 can be easily inspected from outside through, for example, visual inspection.

Also, the heater weld W2 is composed of metal components (Fe, Ni, Cr) derived from stainless steel used to form the sheath tube 131, and metal components (Ni, Fe, Cr) derived from a nickel alloy used to form the membrane 160. That is, the heater weld W2 does not contain other metal components such as a filler metal and is formed by melting only the membrane 160 and the sheath tube 131. Thus, other metal materials such as a filler metal are not required; accordingly, an inexpensive glow plug 1 is yielded.

The above-mentioned glow plug 1 is a glow plug with combustion pressure sensor in which the displacement member is the heater member 130. Therefore, the glow plug 1 can also be utilized as a combustion pressure sensor, in addition to assisting in start-up of an internal combustion engine such as a diesel engine.

Next, a method of manufacturing the glow plug with combustion pressure sensor 1 will be described.

First, the pressure sensor section 200 is connected to the heater member 130 and to the housing 100. Specifically, there are prepared beforehand the heater member 130 in which the sheath tube 131, the heat generating coil 132, and the control coil 133 are united, and the pressure sensor section 200 configured such that the transmission sleeve 220 is joined to the inner circumferential portion 211 of the sensor body 210 while the inner-tube body 192 is joined to the outer circumferential portion 212 of the sensor body 210. The center rod 120 is inserted into the inside, in the radial direction DR, of the inner circumferential portion 211 of the pressure sensor section 200, and the transmission sleeve 220 is externally fitted to the outside, in the radial direction DR, of the sheath tube 131. Subsequently, the metallic-shell forward end portion 110s of the metallic shell 110 and the flange portion 191 of the inner tube 190 are laser-welded. Thus, the housing 100 and the pressure sensor section 200 are connected through the inner-tube body 192 of the inner tube 190. Next, the sleeve forward-end portion 220s of the transmission sleeve 220 is laser-welded to the outer circumferential surface of the sheath tube 131 of the heater member 130. Thus, the heater member 130 and the transmission sleeve 220 of the pressure sensor section 200 are connected to each other.

Figure 4:
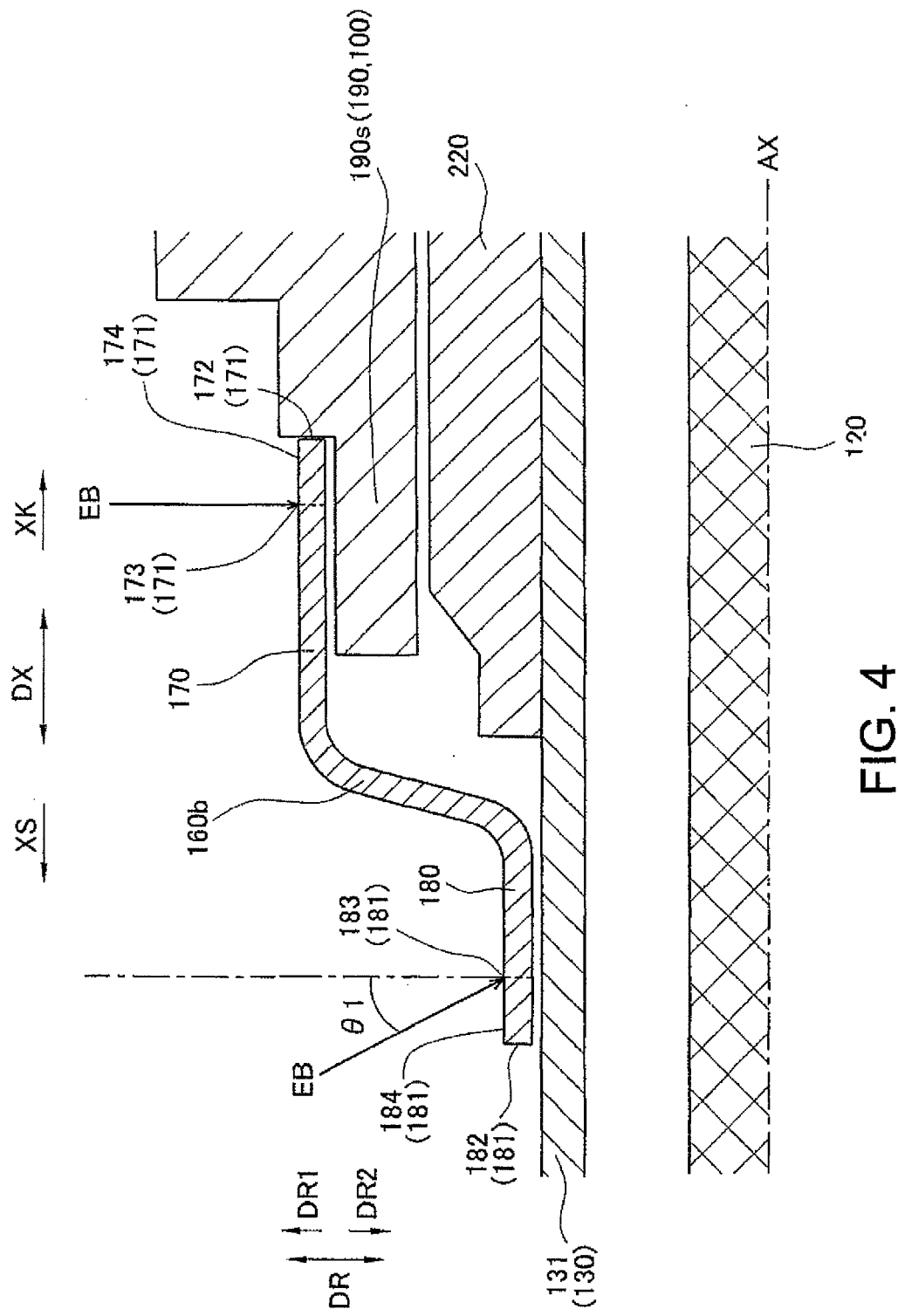
FIG. 4 is an explanatory view for explaining a housing welding step and a heater welding step (displacement member welding step) in a method of manufacturing the glow plug with combustion pressure sensor according to the embodiment.

Next will be described the housing welding step of disposing an unwelded membrane 160b to be welded, externally in the radial direction DR of the housing 100, and irradiating the unwelded membrane 160b with a laser beam EB to thereby weld the membrane 160 and the housing 100 annularly in the circumferential direction DY. Specifically, as shown in FIG. 4, first, an unwelded rear tube portion 170 having a large diameter of the two-step cylindrical unwelded membrane 160b is externally fitted to the forward end portion 190s of the inner tube 190 from the forward side XS in the axial direction DX. The unwelded rear tube portion 170 constitutes, after welding, the aforementioned rear tube portion 178 (see FIG. 3) of the membrane 160. However, since a portion (unmolten rear end portion 171, which will be described later) of the unwelded rear tube portion 170 is melted through irradiation with the laser beam EB and becomes the bulge housing weld RW1, the unwelded rear tube portion 170 is longer in the axial direction DX than the rear tube portion 178.

Also, in the present embodiment, an inside diameter R1 of the unwelded rear tube portion 170 is larger than an outside diameter R2 of the forward end portion 190s of the inner tube 190 (R1>R2). Thus, the unwelded rear tube portion 170 can be easily externally fitted to the forward end portion 190s of the inner tube 190. However, when the unwelded rear tube portion 170 is externally fitted to the forward end portion 190s, they separate in the radial direction DR (i.e. are spaced apart) from each other at least partially in the circumferential direction DY.

In this condition, the unmolten rear end portion 171, located on the rear side XK in the axial direction DX, of the unwelded rear tube portion 170 is irradiated with the laser beam EB (see FIG. 4). Specifically, the unmolten rear end portion 171 is irradiated, at an inward end portion 173 located on the forward side XS with respect to a rear end 172, along the entire circumference with the laser beam EB of continuous oscillation (CW). The laser beam EB is directed toward the inward side DR2 in the radial direction DR of the unwelded membrane 160b.

Then, heat of the laser beam EB directed to the inward end portion 173 also melts a portion 174 of the unmolten rear end portion 171, the portion 174 being located on the rear side XK in the axial direction DX with respect to the inward end portion 173 (the portion 174 is a rear end portion between the rear end 172 and the inward end portion 173). That is, through irradiation with the laser beam EB, the entire unmolten rear end portion 171 composed of the inward end portion 173 and the rear end portion 174 is melted, thereby yielding a large amount of molten metal. The molten metal is first consumed in filling a gap between the unwelded rear tube portion 170 of the unwelded membrane 160b and the forward end portion 190s of the inner tube 190 of the housing 100. However, in the present embodiment, since a large amount of molten metal is available, even though much metal flows into the gap between the forward end portion 190s and the unwelded rear tube portion 170 (rear tube portion 178), unconsumed molten metal still remains. Therefore, the housing weld W1 formed of the remaining molten metal and molten metal derived from the forward end portion 190s becomes the aforementioned bulge housing weld RW1 (see FIG. 3). Thus, even though the unwelded rear tube portion 170 of the unwelded membrane 160b and the forward end portion 190s of the inner tube 190 separate from each other in the radial direction DR, the membrane 160 (rear tube portion 178) and the forward end portion 190s of the inner tube 190 of the housing 100 can be firmly welded through the bulge housing weld RW1. In the present embodiment, since the unwelded rear tube portion 170 is irradiated with the laser beam EB along the entire circumference thereof in the circumferential direction DY, the housing weld W1 is the bulge housing weld RW1 along the entire circumference thereof in the circumferential direction DY.

Next will be described the heater welding step of disposing the unwelded membrane 160b externally in the radial direction DR of the heater member 130, and irradiating the unwelded membrane 160b with the laser beam EB to thereby weld the membrane 160 and the heater member 130 annularly in the circumferential direction DY.

Specifically, as shown in FIG. 4, an unwelded forward tube portion 180 having a small diameter of the two-step cylindrical unwelded membrane 160b is externally fitted to the sheath tube 131 of the heater member 130 from the forward side XS in the axial direction DX. The unwelded forward tube portion 180 constitutes, after welding, the aforementioned forward tube portion 188 (see FIG. 3) of the membrane 160. However, since a portion (unmolten forward end portion 181, which will be described later) of the unwelded forward tube portion 180 is melted through irradiation with the laser beam EB and becomes the bulge heater weld RW2, the unwelded forward tube portion 180 is longer in the axial direction DX than the forward tube portion 188.

Also, in the present embodiment, an inside diameter R3 of the unwelded forward tube portion 180 is larger than an outside diameter R4 of the sheath tube 131 of the heater member 130 (R3>R4). Thus, the unwelded forward tube portion 180 can be easily externally fitted to the sheath tube 131. However, when the unwelded forward tube portion 180 is externally fitted to the sheath tube 131, they separate in the radial direction DR (i.e. are spaced apart) from each other at least partially in the circumferential direction DY.

In this condition, the unmolten forward end portion 181, located on the forward side XS in the axial direction DX, of the unwelded forward tube portion 180 is irradiated with the laser beam EB (see FIG. 4). Specifically, the laser beam EB is directed toward an inward end portion 183, located on the rear side XK with respect to the forward end 182, of the unwelded forward end portion 181 along the entire circumference thereof. The laser beam EB is directed toward the unwelded membrane 160b in a direction which is inclined from the radial direction DR toward the forward side XS in the axial direction DX (in the present embodiment, an irradiation angle θ1 is 30°).

Then, heat of the laser beam EB directed to the inward end portion 183 also melts a portion 184 of the unmolten forward end portion 181, the portion 184 being located on the forward side XS in the axial direction DX with respect to the inward end portion 183 (the portion 184 is a forward end portion between the forward end 182 and the inward end portion 183). That is, through irradiation with the laser beam EB, the entire unmolten forward end portion 181 composed of the inward end portion 183 and the forward end portion 184 is melted, thereby yielding a large amount of molten metal. The molten metal is first consumed in filling a gap between the heater member 130 (sheath tube 131) and the unwelded forward tube portion 180 of the unwelded membrane 160b. However, in the present embodiment, since a large amount of molten metal is available, even though much metal flows into the gap between the sheath tube 131 and the unwelded forward tube portion 180 (forward tube portion 188), unconsumed molten metal still remains. Therefore, the heater weld W2 formed of the remaining molten metal and molten metal derived from the sheath tube 131 becomes the aforementioned bulge heater weld RW2 (see FIG. 3). Thus, even though the unwelded forward tube portion 180 of the unwelded membrane 160b and the sheath tube 131 of the heater member 130 separate from each other in the radial direction DR, the membrane 160 (forward tube portion 188) and the sheath tube 131 of the heater member 130 can be firmly welded through the bulge heater weld RW2. In the present embodiment, since the unwelded forward tube portion 180 is irradiated with the laser beam EB along the entire circumference thereof in the circumferential direction DY, the heater weld W2 is the bulge heater weld RW2 along the entire circumference thereof in the circumferential direction DY.

Subsequently, the forward end cap 150 is externally fitted to the forward end portion 190s of the inner tube 190, and the flange portion 191 of the inner tube 190 and the cylindrical portion 151 of the forward end cap 150 are welded. As a result of this welding, the metallic shell 110, the inner tube 190, and the forward end cap 150 are united, thereby yielding the housing 100.

Furthermore, the terminal assembly 250 is attached to the rear side XK of the housing 100 by a known method, thereby completing the glow plug 1 (see FIG. 1).

In the present embodiment, the above-mentioned heater welding step corresponds to "displacement member welding step."

The method of manufacturing the glow plug 1 according to the present embodiment forms, in the housing welding step, the housing weld W1 at least a portion of which is the bulge housing weld RW1 having a sufficient amount of weld metal for welding the membrane 160 and the housing 100 (inner tube 190) as a result of the unmolten rear end portion 171 (inward end portion 173) of the unwelded membrane 160b being melted through irradiation with the laser beam EB. Therefore, the method can manufacture the glow plug 1 in which the membrane 160 and the housing 100 (inner tube 190) can be firmly welded through the bulge housing weld RW1.

Also, in the housing welding step, the laser beam EB is directed to the inward end portion 173 of the unmolten rear end portion 171. Thus, in the unmolten rear end portion 171, the inward end portion 173 and the rear end portion 174 located on the rear side XK with respect to the inward end portion 173 are melted to thereby form the housing weld W1. Therefore, the method can easily manufacture the glow plug 1 having the housing weld W1 at least a portion of which is the bulge housing weld RW1.

Meanwhile, the method forms, in the heater welding step, the heater weld W2 at least a portion of which is the bulge heater weld RW2 having a sufficient amount of weld metal for welding the membrane 160 and the heater member 130 (sheath tube 131) as a result of the unmolten forward end portion 181 (inward end portion 183) of the unwelded membrane 160b being melted through irradiation with the laser beam EB. Therefore, the method can manufacture the glow plug 1 in which the membrane 160 and the heater member 130 (sheath tube 131) can be firmly welded through the bulge heater weld RW2.

Also, in the heater welding step, the laser beam EB is directed to the inward end portion 183 of the unmolten forward end portion 181. Thus, in the unmolten forward end portion 181, the inward end portion 183 and the forward end portion 184 located on the forward side XS with respect to the inward end portion 183 are melted to thereby form the bulge heater weld RW2. Therefore, the method can easily manufacture the glow plug 1 having the heater weld W2 at least a portion of which is the bulge heater weld RW2.

The displacement member is the heater member 130; thus, the method can reliably manufacture the glow plug with combustion pressure sensor 1 which assists start-up of an internal combustion engine such as a diesel engine and can also be utilized as a combustion pressure sensor.

First Modified Embodiment

A glow plug with combustion pressure sensor 301 according to a first modification of the above-described embodiment will next be described with reference to FIGS. 1 through 3 and 5.

The present first modified embodiment differs from the above-mentioned embodiment in that the unmolten end portion (the unmolten forward end portion or the unmolten rear end portion) of the unwelded membrane is thicker than other portions (e.g., the end adjacent portion adjacent to the unmolten end portion).

Thus, the present first modified embodiment will be described, centering on features different from those of the embodiment, and description of similar features will be omitted or briefed. Similar features yield similar actions and effects. Also, in the following description, like members and portions are denoted by like reference numerals.

Similar to the glow plug 1 of the embodiment mentioned above, the glow plug 301 (see FIGS. 1 to 3) of the present first modified embodiment has the housing weld W1 which welds, annularly in the circumferential direction DY, the rear end portion 179, located on the rear side XK in the axial direction DX, of the membrane 160, and the forward end portion 190s of the inner tube 190 mentioned above, and the housing weld W1 is the bulge housing weld RW1 along the entire circumference thereof in the circumferential direction DY. The glow plug 301 also has the heater weld W2 which welds, annularly in the circumferential direction DY, the sheath tube 131 of the heater member 130 mentioned above, and the forward end portion 189, located on the forward side XS in the axial direction DX, of the membrane 160, and the heater weld W2 is the bulge heater weld RW2 along the entire circumference thereof in the circumferential direction DY.

However, an unwelded membrane 360b to be welded to the housing 100 in the housing welding step differs from the unwelded membrane 160b of the embodiment. Specifically, an unmolten rear end portion 371 (thickness T1), located on the rear side XK in the axial direction DX, of an unwelded rear tube portion 370 of an unwelded membrane 360b assuming the form of a two-step cylinder is larger in thickness along the entire circumference thereof in the circumferential direction DY than an adjacent portion 375 (thickness T2) adjacent to the forward side XS of the unmolten rear end portion 371 (T1>T2) (see FIG. 5).

In the housing welding step of the present first modified embodiment, similar to the case of the embodiment, the unwelded membrane 360b is fitted to the housing 100 (inner tube 190) from outside in the radial direction DR, followed by welding thereof. However, the unwelded rear tube portion 370 and the forward end portion 190s of the inner tube 190 separate in the radial direction DR from each other at least partially in the circumferential direction DY. In this condition, the laser beam EB is directed toward the unmolten rear end portion 371 of the unwelded membrane 360b along the entire circumference (see FIG. 5). Similar to the case of the embodiment, the laser beam EB is directed toward the inward side DR2 in the radial direction DR of the unwelded membrane 360b.

Then, as a result of irradiation with the laser beam EB, the unmolten rear end portion 371 melts, thereby yielding a large amount of molten metal. The molten metal is first consumed in filling a gap between the unwelded rear tube portion 370 and the forward end portion 190s of the inner tube 190. However, in the present first modified embodiment, since a large amount of molten metal is available, even though much metal flows into the gap between the forward end portion 190s and the unwelded rear tube portion 370 (rear tube portion 178), unconsumed molten metal still remains. Therefore, the housing weld W1 formed of the remaining molten metal and molten metal derived from the forward end portion 190s becomes the aforementioned bulge housing weld RW1 (see FIG. 3). Thus, similar to the case of the embodiment, even though the unwelded rear tube portion 370 of the unwelded membrane 360b and the forward end portion 190s of the inner tube 190 separate from each other in the radial direction DR, the membrane 160 (rear tube portion 178) and the forward end portion 190s of the inner tube 190 of the housing 100 can be firmly welded through the bulge housing weld RW1.

Figure 5:
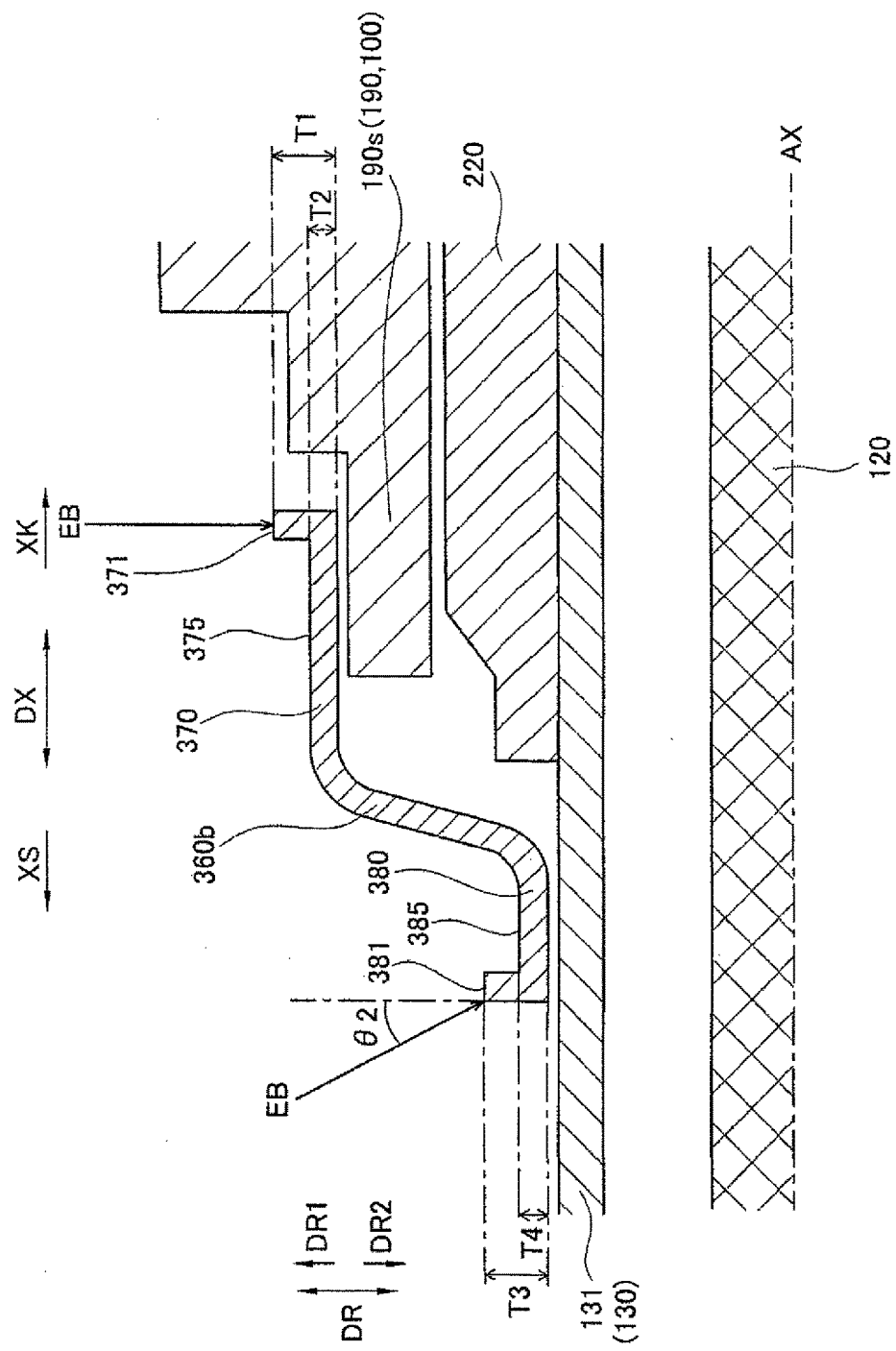
FIG. 5 is an explanatory view for explaining a housing welding step and a heater welding step (displacement member welding step) in a method of manufacturing the glow plug with combustion pressure sensor according to the first modified embodiment.

Similarly, an unmolten rear end portion 381 (thickness T3), located on the forward side XS in the axial direction DX, of an unwelded forward tube portion 380 of the unwelded membrane 360b is larger in thickness along the entire circumference thereof in the circumferential direction DY than an adjacent portion 385 (thickness T4) adjacent to the rear side XK of the unmolten forward end portion 381 (T3>T4) (see FIG. 5). In this regard also, the unwelded membrane 360b differs from the unwelded membrane 160b of the embodiment.

In the heater welding step of the present first modified embodiment, similar to the case of the embodiment, the unwelded membrane 360b is fitted to the heater member 130 (sheath tube 131) from outside in the radial direction DR, followed by welding thereof. However, the unwelded forward tube portion 380 and the sheath tube 131 separate in the radial direction DR (i.e. are spaced apart) from each other at least partially in the circumferential direction DY. In this condition, the laser beam EB is directed toward the unmolten forward end portion 381 of the unwelded membrane 360b along the entire circumference (see FIG. 5). Similar to the case of the embodiment, the laser beam EB is directed toward the unwelded membrane 360b in a direction which is inclined from the radial direction DR toward the forward side XS in the axial direction DX (in the present first modified embodiment, an irradiation angle θ2 is 30°).

Then, as a result of irradiation with the laser beam EB, the unmolten forward end portion 381 melts, thereby yielding a large amount of molten metal. The molten metal is first consumed in filling a gap between the unwelded forward tube portion 380 and the heater member 130 (sheath tube 131). However, in the present first modified embodiment, since a large amount of molten metal is available, even though much metal flows into the gap between the sheath tube 131 and the unwelded forward tube portion 380 (forward tube portion 188), unconsumed molten metal still remains. Therefore, the heater weld W2 formed of the remaining molten metal and molten metal derived from the sheath tube 131 becomes the aforementioned bulge heater weld RW2 (see FIG. 3). Thus, similar to the case of the embodiment, even though the sheath tube 131 and the unwelded forward tube portion 380 of the unwelded membrane 360b separate from each other in the radial direction DR, the membrane 160 (forward tube portion 188) and the heater member 130 (sheath tube 131) can be firmly welded through the bulge heater weld RW2.

In the method of manufacturing the glow plug 301 according to the present first modified embodiment, the unmolten rear end portion 371 of the unwelded membrane 360b is thicker than the adjacent portion 375 adjacent to the unmolten rear end portion 371. Thus, in the housing welding step, the thick unmolten rear end portion 371 is melted through irradiation with the laser beam EB to thereby form the housing weld W1. Therefore, the method can easily manufacture the glow plug 301 having the housing weld W1 at least a portion of which is the bulge housing weld RW1.

Also, the unmolten forward end portion 381 of the unwelded membrane 360b is thicker than the adjacent portion 385 adjacent to the unmolten forward end portion 381. Thus, in the heater welding step, the thick unmolten forward end portion 381 is melted through irradiation with the laser beam EB to thereby form the heater weld W2. Therefore, the method can easily manufacture the glow plug 301 having the heater weld W2 at least a portion of which is the bulge heater weld RW2.

Second Modified Embodiment

The embodiment and the first modified embodiment have been described while referring to the glow plug with combustion pressure sensors 1 and 301 in which the bulge housing weld RW1 welds the housing 100 (inner tube 190) and the rear end portion 179 of the membrane 160, and the bulge heater weld RW2 welds the heater member 130 (sheath tube 131) and the forward end portion 189 of the membrane 160.

Figure 6:
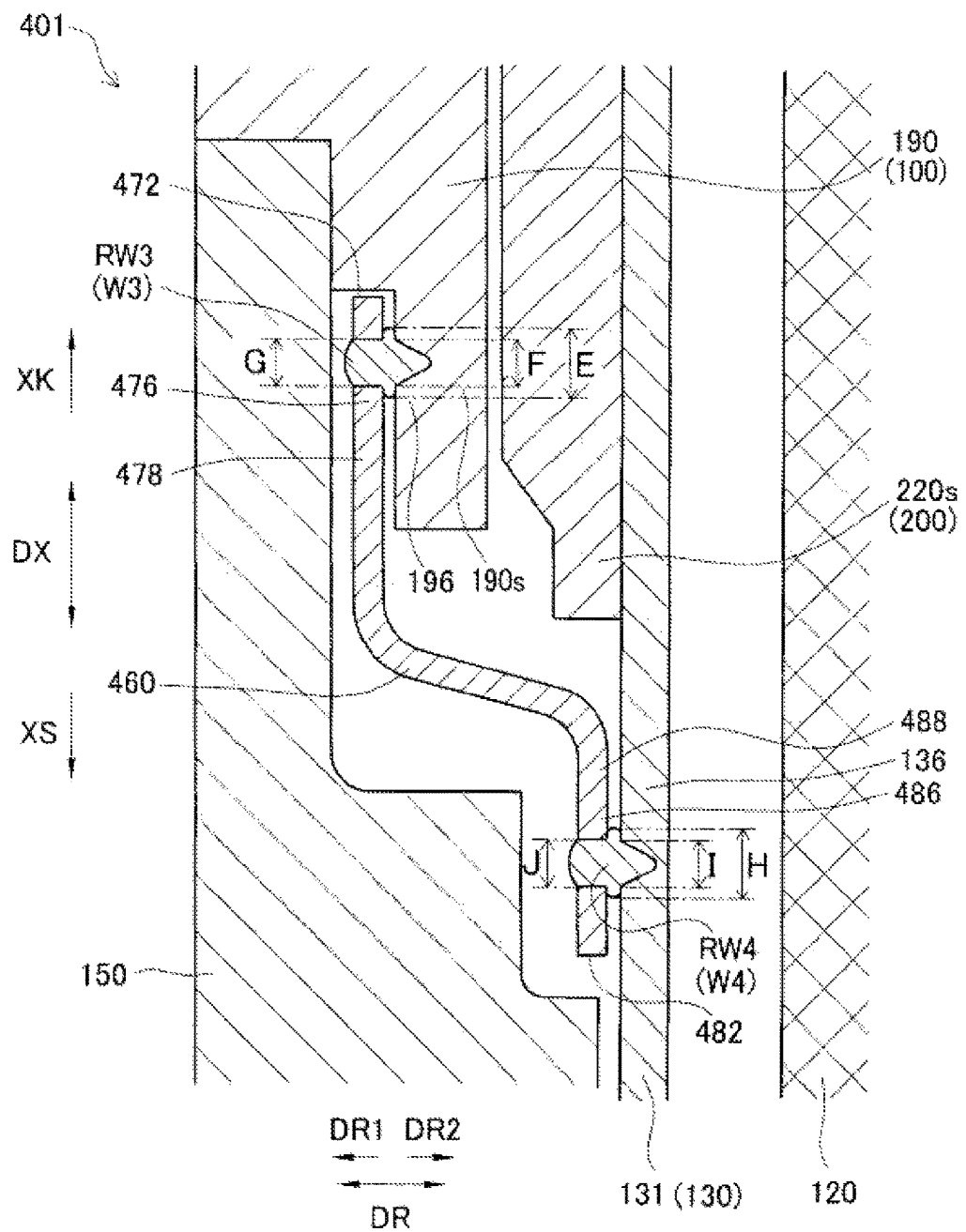
FIG. 6 is an explanatory view for explaining a glow plug with combustion pressure sensor according to the second modified embodiment.

However, the present invention may be embodied as a glow plug with combustion pressure sensor 401 (second modified embodiment) shown in FIGS. 1, 2, and 6. In the glow plug with combustion pressure sensor 401, a bulge housing weld RW3 (housing weld W3) welds the housing 100 (inner-tube adjacent portion 196) and a portion of a membrane 460 which is separated from a rear end 472 of the membrane 460 in the axial direction DX; i.e., a portion of the membrane 460 which is located inward in the axial direction DX (here, on the forward side XS) in relation to the rear end 472. Namely, the bulge housing weld RW3 (housing weld W3) may be formed such that the rear end 472 of the membrane 460 (connection member) is present outward in the axial direction DX (here, on the rear side XK). Since the housing 100 and a portion of the membrane 460 separated from the rear end 472 thereof in the axial direction DX are welded at the bulge housing weld RW3 as described above, it is unnecessary to secure the welding position accuracy of the bulge housing weld RW3, and the housing 100 and the membrane 460 can be connected without fail.

Notably, the dimension E of the bulge housing weld RW3 in the axial direction DX measured in the space between the housing 100 (inner-tube adjacent portion 196) and the membrane 460 (rear tube portion 478) is greater than the axial dimension F measured in the inner-tube adjacent portion 196 of the housing 100 and the axial dimension G measured in the rear tube portion 478 of the membrane 460. As described above, the dimension E of the bulge housing weld RW3 in the axial direction DX is large in the space between the housing 100 and the membrane 460 separated from each other. Therefore, the strength of joint between the housing 100 and the membrane 460 can be increased further.

Also, a bulge heater weld RW4 (heater weld W4) welds the heater member 130 (tube adjacent portion 136) and a portion of the membrane 460 which is separated from a forward end 482 of the membrane 460 in the axial direction DX; i.e., a portion of the membrane 460 which is located inward in the axial direction DX (here, on the rear side XK) in relation to the forward end 482. Namely, the bulge heater weld RW4 (heater weld W4) may be formed such that the forward end 482 of the membrane 460 (connection member) is present outward in the axial direction DX (here, on the forward side XS). Since the heater member 130 and a portion of the membrane 460 separated from the forward end 482 thereof in the axial direction DX are welded at the bulge heater weld RW4 as described above, it is unnecessary to secure the welding position accuracy of the bulge heater weld RW4, and the heater member 130 and the membrane 460 can be connected without fail.

Notably, the dimension H of the bulge heater weld RW4 in the axial direction DX measured in the space between the heater member 130 (tube adjacent portion 136) and the membrane 460 (forward tube portion 488) is greater than the axial dimension I measured in the tube adjacent portion 136 of the heater member 130 and the axial dimension J measured in the forward tube portion 488 of the membrane 460. As described above, the dimension H of the bulge heater weld RW4 in the axial direction DX is large in the space between the heater member 130 and the membrane 460 separated from each other. Therefore, the strength of joint between the heater member 130 and the membrane 460 can be increased further.

Figure 7:
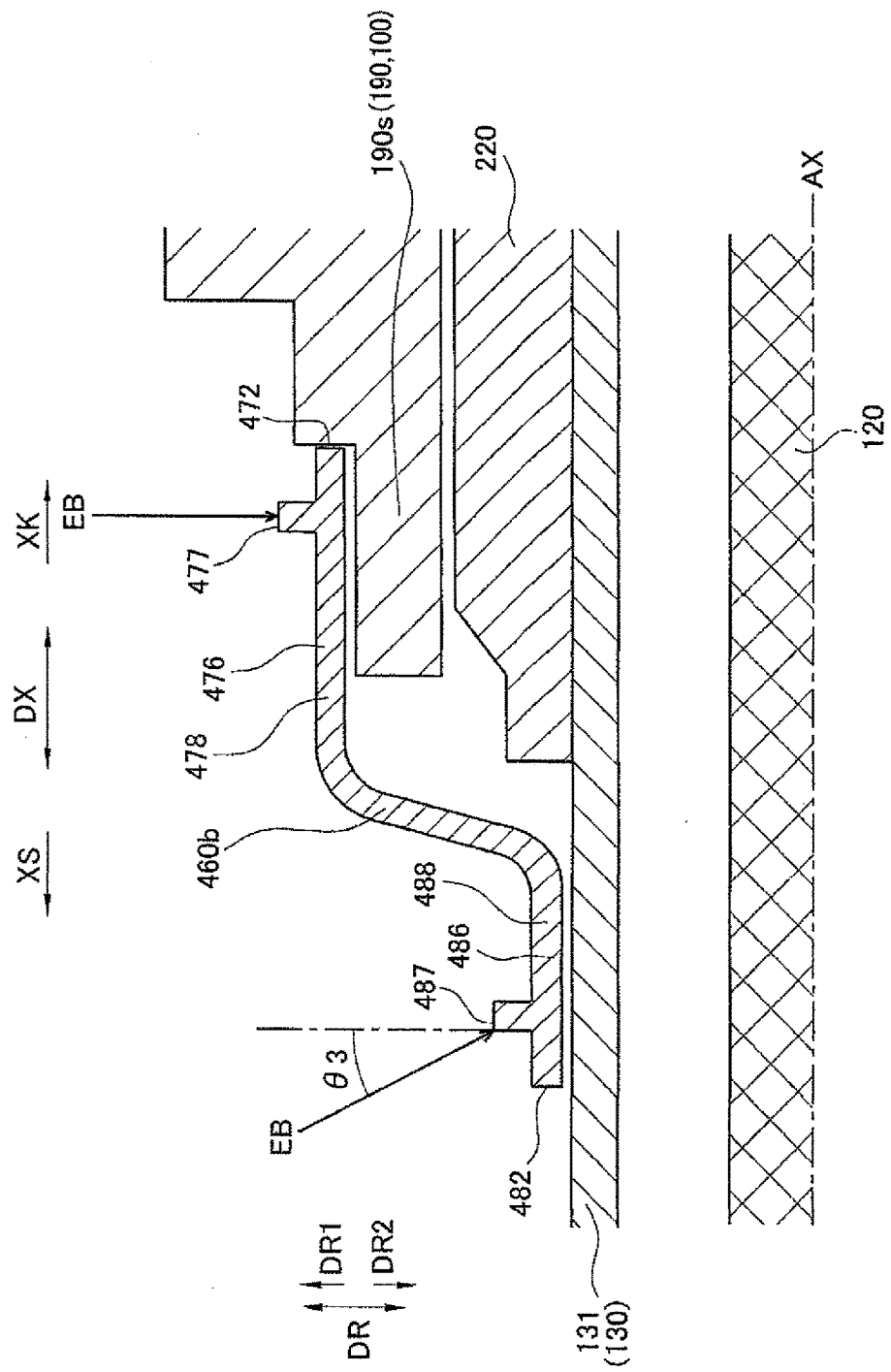
FIG. 7 is an explanatory view for explaining a housing welding step and a heater welding step (displacement member welding step) in a method of manufacturing the glow plug with combustion pressure sensor according to the second modified embodiment.

Preferably, the above-mentioned glow plug with combustion pressure sensor 401 is manufactured in a manner similar to that in the above-described first modified embodiment mentioned above. In the housing welding step, an unwelded membrane 460b is used. The unwelded membrane 460b has a thick portion 477 which is separated from the rear end 472 in the axial direction DX; i.e., located inward in the axial direction DX (here, on the forward side XS) in relation to the rear end 472, and which has a thickness larger than that of an adjacent rear-end adjacent portion 476. A laser beam EB is applied to the thick portion 477 to thereby form the bulge housing weld RW3 such that the rear end 472 remains (see FIG. 7).

Also, in the heater welding step, an unwelded membrane 460b is used. The unwelded membrane 460b has a thick portion 487 which is separated from the forward end 482 in the axial direction DX; i.e., located inward in the axial direction DX (here, on the rear side XK) in relation to the forward end 482, and which has a thickness larger than that of an adjacent forward-end adjacent portion 486. A laser beam EB is applied to the thick portion 487 to thereby form the bulge heater weld RW4 such that the forward end 482 remains (see FIG. 7).

While the present invention has been described with reference to the embodiment and the first and second modified embodiments, the present invention is not limited thereto, but may be modified as appropriate without departing from the gist of the invention.

For example, the embodiment and modified embodiments have been described while referring to the glow plug with combustion pressure sensors 1, 301, and 401 having both of the bulge housing weld RW1, RW3 and the bulge heater weld RW2, RW4. However, the glow plug with combustion pressure sensor may have either the bulge housing weld or the bulge heater weld. Also, the embodiment and modified embodiments have been described while referring to the glow plug with combustion pressure sensors 1 and 301 in which the housing weld W1 is the bulge housing weld RW1 along the entire circumference thereof in the circumferential direction DY. However, the glow plug with combustion pressure sensor may be such that a portion of the housing weld is the bulge housing weld. Also, the embodiments have been described while referring to the glow plug with combustion pressure sensors 1 and 301 in which the heater weld W2 is the bulge heater weld RW2 along the entire circumference thereof in the circumferential direction DY; however, the glow plug with combustion pressure sensor may be such that a portion of the heater weld (displacement member weld) is the bulge heater weld (displacement member weld).

The embodiment and the modified embodiments have been described while referring to the glow plug with combustion pressure sensors 1 and 301 in which the housing weld W1 (bulge housing weld RW1) is composed of metal components derived from stainless steel used to form the inner tube 190 of the housing 100 and metal components derived from a nickel alloy used to form the membrane 160. Also, the embodiments have been described while referring to the glow plug with combustion pressure sensors 1 and 301 in which the heater weld W2 (bulge heater weld RW2) is composed of metal components derived from stainless steel used to form the sheath tube 131 and metal components derived from a nickel alloy used to form the membrane 160. However, the housing weld or the displacement member weld may contain metal components other than those derived from the housing or the displacement member and those derived from the connection member. For example, in the housing welding step (or the displacement member welding step), welding may be performed by use of a filler metal or the like.

In the embodiment and the modified embodiments, the forward end portion 190s of the inner tube 190 and the rear tube portion 178 of the membrane 160 are laser-welded annularly in the circumferential direction DY, thereby forming the housing weld W1 or W3. However, the housing weld may be formed by laser-welding, annularly in the circumferential direction, the rear tube portion of the membrane and a portion of the housing other than the forward end portion of the inner tube; for example, the cylindrical portion of the forward end cap of the housing.

Also, the embodiments have been described while referring to the glow plug with combustion pressure sensors 1 and 301 in which the heater member 130 is a sheath heater configured such that the heat generating coil 132 and the control coil 133 are disposed within the sheath tube 131. However, the glow plug with combustion pressure sensor may employ, as the heater member, a ceramic heater member (appearing in, for example, Japanese Patent Application Laid-Open (kokai) No. 2013-24488) configured such that an outer tube of metal is externally fitted to a ceramic heater in which a heat generating element formed of electrically conductive ceramic is disposed within an electrically insulating ceramic element. In this case, the membrane (connection member) and the outer tube are laser-welded annularly in the circumferential direction.

Furthermore, the embodiment and the modified embodiments have been described while referring to the glow plug with combustion pressure sensor 1, 301 in which the heater member 130 is disposed in the housing 100. However, the present invention may be embodied as a combustion pressure sensor which does not have the function of a glow plug and which employs, in place of the heater member, a displacement member which is displaced in the axial direction with pressure received from the axially forward side.

DESCRIPTION OF REFERENCE NUMERALS 1, 301, 401: glow plug with combustion pressure sensor (combustion pressure sensor)
100: housing
130: heater member
130s: heater forward end portion (forward end portion)
136: tube adjacent portion (fourth adjacent portion)
150: forward end cap (housing)
150s: forward end (of forward end cap) (forward end of housing)
160, 460: membrane (connection member)
160b, 360b, 460b: unwelded membrane (unwelded connection member)
171, 371: unmolten rear end portion (of unwelded membrane) (unmolten end portion)
172: rear end (of unwelded membrane) (end (of unwelded connection member))
173: inward end portion (of unwelded rear end portion)
375: adjacent portion (end adjacent portion)
176, 476: rear-end adjacent portion (first adjacent portion)

178, 478: rear tube portion
179: rear end portion (end portion)
181, 381: unmolten forward end portion (unmolten end portion)
182: forward end (end (of unwelded connection member))
183: inward end portion (of unmolten forward end portion)
186, 486: forward-end adjacent portion (third adjacent portion)
188, 488: forward tube portion
189: forward end portion (end portion)
196: inner-tube adjacent portion (second adjacent portion)
375, 385: adjacent portion (end adjacent portion)
472: rear end (of membrane) (end)
482: forward end (of membrane) (end)
DR: radial direction
DR1: outward side (in radial direction) (direction directed from second adjacent portion toward first adjacent portion, direction directed from fourth adjacent portion toward third adjacent portion)
DX: axial direction
XS: forward side (in axial direction)
XK: rear side (in axial direction)
DY: circumferential direction
EB: laser beam (energy beam)
RW1, RW3: bulge housing weld
RW2, RW4: bulge heater weld (bulge displacement member weld)
W1, W3: housing weld (housing weld)
W2, W4: heater weld (displacement member weld)
E, F, G: dimension (of bulge housing weld in axial direction)
H, I, J: dimension (of bulge heater weld in axial direction)

Having described the invention, the following is claimed:

1. A combustion pressure sensor comprising
a tubular housing extending in an axial direction;
a displacement member at least a portion of which is disposed within the housing and which is displaced in the axial direction with pressure received from a forward side in the axial direction; and
a tubular connection member which elastically connects the displacement member to the housing,
the combustion pressure sensor having a housing weld which is formed by energy-beam-welding the housing and the connection member annularly in a circumferential direction of the housing and the connection member while the housing and the connection member are separated from each other at least partially in the circumferential direction; which contains metal components derived from the housing and metal components derived from the connection member; and which includes, in a longitudinal section of the combustion pressure sensor, a wedged weld resulting from wedgewise melting of a portion of the housing,
wherein at least a portion in the circumferential direction of the housing weld is a bulge housing weld which bulges, with respect to a first adjacent portion, in a direction directed from a second adjacent portion toward the first adjacent portion along a radial direction, where
the first adjacent portion is a portion of the connection member adjacent to the housing weld, and
the second adjacent portion is a portion of the housing adjacent to the housing weld.

2. A combustion pressure sensor according to claim 1, wherein the housing weld is the bulge housing weld along the entire circumference thereof in the circumferential direction.

3. A combustion pressure sensor according to claim 1 or 2, wherein the housing weld welds the housing and an end portion of the connection member.

4. A combustion pressure sensor according to claim 1 or 2, wherein the housing weld welds the housing and a portion of the connection member separated from an end thereof in the axial direction.

5. A combustion pressure sensor according to claim 4, wherein a dimension of the housing weld in the axial direction measured in a space between the housing and the connection member separated from each other is greater than that measured in the housing and that measured in the connection member.

6. A combustion pressure sensor according to claim 1 or 2, wherein the housing weld is composed of metal components derived from the housing and metal components derived from the connection member.

7. A combustion pressure sensor comprising
a tubular housing extending in an axial direction;
a displacement member at least a portion of which is disposed within the housing and which is displaced in the axial direction with pressure received from a forward side in the axial direction; and
a tubular connection member which elastically connects the displacement member to the housing,
the combustion pressure sensor having a displacement member weld which is formed by energy-beam-welding the displacement member and the connection member annularly in a circumferential direction of the displacement member and the connection member while the displacement member and the connection member are separated from each other at least partially in the circumferential direction; which contains metal components derived from the displacement member and metal components derived from the connection member; and which includes, in a longitudinal section of the combustion pressure sensor, a wedged weld resulting from wedgewise melting of a portion of the displacement member,
wherein at least a portion in the circumferential direction of the displacement member weld is a bulge displacement member weld which bulges, with respect to a third adjacent portion, in a direction directed from a fourth adjacent portion toward the third adjacent portion along a radial direction, where
the third adjacent portion is a portion of the connection member adjacent to the displacement member weld, and
the fourth adjacent portion is a portion of the displacement member adjacent to the displacement member weld.

8. A combustion pressure sensor according to claim 7, wherein the displacement member weld is the bulge displacement member weld along the entire circumference thereof in the circumferential direction.

9. A combustion pressure sensor according to claim 7 or 8, wherein the displacement member weld welds the displacement member and an end portion of the connection member.

10. A combustion pressure sensor according to claim 7 or 8, wherein the displacement member weld welds the displacement member and a portion of the connection member separated from an end thereof in the axial direction.

11. A combustion pressure sensor according to claim 10, wherein a dimension of the displacement member weld in the axial direction measured in a space between the displacement member and the connection member is greater than that measured in the displacement member and that measured in the connection member.

12. A combustion pressure sensor according to claim 7 or 8, wherein the displacement member weld is composed of metal components derived from the displacement member and metal components derived from the connection member.

13. A glow plug with combustion pressure sensor comprising a combustion pressure sensor having
a tubular housing extending in an axial direction;
a displacement member at least a portion of which is disposed within the housing and which is displaced in the axial direction with pressure received from a forward side in the axial direction; and
a tubular connection member which elastically connects the displacement member to the housing,
the combustion pressure sensor having a housing weld which is formed by energy-beam-welding the housing and the connection member annularly in a circumferential direction of the housing and the connection member while the housing and the connection member are separated from each other at least partially in the circumferential direction; which contains metal components derived from the housing and metal components derived from the connection member; and which includes, in a longitudinal section of the combustion pressure sensor, a wedged weld resulting from wedgewise melting of a portion of the housing,
wherein at least a portion in the circumferential direction of the housing weld is a bulge housing weld which bulges, with respect to a first adjacent portion, in a direction directed from a second adjacent portion toward the first adjacent portion along a radial direction, where
the first adjacent portion is a portion of the connection member adjacent to the housing weld, and
the second adjacent portion is a portion of the housing adjacent to the housing weld.

14. A method of manufacturing a combustion pressure sensor which comprises
a tubular housing extending in an axial direction;
a displacement member at least a portion of which is disposed within the housing and which is displaced in the axial direction with pressure received from a forward side in the axial direction; and
a tubular connection member which elastically connects the displacement member to the housing;
which has a housing weld formed by energy-beam-welding the housing and the connection member annularly in a circumferential direction of the housing and the connection member while the housing and the connection member are separated from each other at least partially in the circumferential direction; containing metal components derived from the housing and metal components derived from the connection member; and including, in a longitudinal section of the combustion pressure sensor, a wedged weld resulting from wedgewise melting of a portion of the housing; and
in which at least a portion in the circumferential direction of the housing weld is a bulge housing weld which bulges, with respect to a first adjacent portion, in a direction directed from a second adjacent portion toward the first adjacent portion along a radial direction, where
the first adjacent portion is a portion of the connection member adjacent to the housing weld, and
the second adjacent portion is a portion of the housing adjacent to the housing weld;
the method comprising a housing welding step of welding the connection member and the housing annularly in the circumferential direction by disposing the housing and an unwelded connection member to overlap each other in the radial direction, and irradiating the unwelded connection member with an energy beam to form the housing weld.

15. A method of manufacturing a combustion pressure sensor according to claim 14, wherein in the housing welding step, the unmolten end portion of the unwelded connection member is irradiated with the energy beam at an inward end portion located away from an end of the unmolten end portion.

16. A method of manufacturing a combustion pressure sensor according to claim 14 or 15, wherein the unwelded connection member is such that the unmolten end portion is thicker than an end adjacent portion adjacent to the unmolten end portion.

17. A method of manufacturing a combustion pressure sensor which comprises
a tubular housing extending in an axial direction;
a displacement member at least a portion of which is disposed within the housing and which is displaced in the axial direction with pressure received from a forward side in the axial direction; and
a tubular connection member which elastically connects the displacement member to the housing;
which has a displacement member weld formed by energy-beam-welding the displacement member and the connection member annularly in a circumferential direction of the displacement member and the connection member while the displacement member and the connection member are separated from each other at least partially in the circumferential direction; containing metal components derived from the displacement member and metal components derived from the connection member; and including, in a longitudinal section of the combustion pressure sensor, a wedged weld resulting from wedgewise melting of a portion of the displacement member; and
in which at least a portion in the circumferential direction of the displacement member weld is a bulge displacement member weld which bulges, with respect to a third adjacent portion, in a direction directed from a fourth adjacent portion toward the third adjacent portion along a radial direction, where
the third adjacent portion is a portion of the connection member adjacent to the displacement member weld, and
the fourth adjacent portion is a portion of the displacement member adjacent to the displacement member weld;
the method comprising a displacement member welding step of welding the connection member and the displacement member annularly in the circumferential direction by disposing the displacement member and an unwelded connection member to overlap each other in the radial direction, and irradiating the unwelded connection member with an energy beam to form the displacement member weld.

18. A method of manufacturing a combustion pressure sensor according to claim 17, wherein in the displacement member welding step, the unmolten end portion of the unwelded connection member is irradiated with the energy beam at an inward end portion located away from an end of the unmolten end portion.

19. A method of manufacturing a combustion pressure sensor according to claim 17 or 18, wherein the unwelded connection member is such that the unmolten end portion is thicker than an end adjacent portion adjacent to the unmolten end portion.

20. A method of manufacturing a combustion pressure sensor according to claim 14 or 17, wherein the displacement member is a heater member disposed in the housing such that a forward end portion thereof protrudes from a forward end of the housing.

* * * * *